(12) United States Patent
Sun et al.

(10) Patent No.: US 11,578,239 B2
(45) Date of Patent: Feb. 14, 2023

(54) IR-REFLECTIVE INK, FILM, AND TAPE

(71) Applicant: SUN CHEMICAL CORPORATION, Parsippany, NJ (US)

(72) Inventors: Bo Sun, Bardonia, NY (US); Jerome Moyer, West New York, NJ (US); Philippe Schottland, Sparta, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 438 days.

(21) Appl. No.: 16/638,244

(22) PCT Filed: Aug. 29, 2018

(86) PCT No.: PCT/US2018/048436
§ 371 (c)(1),
(2) Date: Feb. 11, 2020

(87) PCT Pub. No.: WO2019/046361
PCT Pub. Date: Mar. 7, 2019

(65) Prior Publication Data
US 2020/0224063 A1  Jul. 16, 2020

Related U.S. Application Data

(60) Provisional application No. 62/669,576, filed on May 10, 2018, provisional application No. 62/553,370, filed on Sep. 1, 2017.

(51) Int. Cl.
C09J 7/29 (2018.01)
C09J 7/38 (2018.01)
(Continued)

(52) U.S. Cl.
CPC ............. C09J 7/29 (2018.01); B32B 7/023 (2019.01); C09D 11/037 (2013.01);
(Continued)

(58) Field of Classification Search
CPC ...... B32B 2307/402; B32B 2307/4023; B32B 2307/408; B32B 2307/416;
(Continued)

(56) References Cited

U.S. PATENT DOCUMENTS 7,241,500 B2    7/2007  Shiao et al.
9,056,988 B2 *  6/2015  Decker .................. C09D 7/67
(Continued)

FOREIGN PATENT DOCUMENTS

CN   102952428       3/2013
EP   1 469 414 A2   10/2004
(Continued)

OTHER PUBLICATIONS

European Search Report issued in counterpart Application No. 18849594.9, dated Aug. 31, 2021.
International Search Report issued in International Application No. PCT/US18/48436, dated Jan. 22, 2019.
Written Opinion of the International Searching Authority issued in International Application No. PCT/US18/48436, dated Jan. 22, 2019.

*Primary Examiner* — Mark Kopec
*Assistant Examiner* — Jaison P Thomas
(74) *Attorney, Agent, or Firm* — Marian E. Fundytus; Ostrolenk Faber LLP

(57) ABSTRACT

The present application is drawn to infrared reflective ink formulations, infrared reflective dried coatings prepared from such inks, and IR-reflective substrates and adhesive tapes prepared from such inks and coatings. The inks are suitable for printing by gravure or flexo methods onto polymeric substrates such as PET, paper, or other substrate materials. The coatings are reflective in the near-infrared range. The coatings and tapes are well suited for use in manufacturing methods. The coatings and/or the tapes are (Continued)

ultrathin, on the order of a few micrometers, making them attractive for use in different industrial applications.

23 Claims, 12 Drawing Sheets

(51) Int. Cl.
*C09D 11/037* (2014.01)
*C09D 11/106* (2014.01)
*C09J 11/04* (2006.01)
*B32B 7/023* (2019.01)
*C08K 3/013* (2018.01)
*C08K 3/22* (2006.01)
*C09D 11/033* (2014.01)
*B32B 7/06* (2019.01)
*B32B 7/12* (2006.01)

(52) U.S. Cl.
CPC ............... *C09D 11/106* (2013.01); *C09J 7/38* (2018.01); *C09J 11/04* (2013.01); *B32B 7/06* (2013.01); *B32B 7/12* (2013.01); *B32B 2307/402* (2013.01); *B32B 2307/408* (2013.01); *B32B 2307/4023* (2013.01); *B32B 2307/416* (2013.01); *B32B 2405/00* (2013.01); *B32B 2457/00* (2013.01); *C08K 3/013* (2018.01); *C08K 3/22* (2013.01); *C09D 11/033* (2013.01); *C09J 2301/302* (2020.08); *C09J 2301/41* (2020.08); *C09J 2431/006* (2013.01); *C09J 2467/006* (2013.01)

(58) Field of Classification Search
CPC ............ B32B 2405/00; B32B 2457/00; B32B 7/02; B32B 7/023; B32B 7/06; B32B 7/12; C08K 3/013; C08K 3/22; C09D 11/033; C09D 11/037; C09D 11/106; C09J 11/04; C09J 2301/302; C09J 2301/41; C09J 2431/006; C09J 2467/006; C09J 7/29; C09J 7/03; C09J 7/38
See application file for complete search history.

(56) References Cited

U.S. PATENT DOCUMENTS

| | | |
|---|---|---|
| 2004/0156986 A1 | 8/2004 | Yadav |
| 2004/0206904 A1 | 10/2004 | Djordjevic |
| 2010/0047620 A1* | 2/2010 | Decker .................... C09D 7/41 |
| | | 428/688 |
| 2011/0041726 A1 | 2/2011 | Robb et al. |
| 2011/0048276 A1 | 3/2011 | Schlegl et al. |
| 2011/0247524 A1* | 10/2011 | Sanada .................. C09D 5/006 |
| | | 106/459 |
| 2011/0248225 A1 | 10/2011 | Mamak et al. |
| 2011/0290375 A1* | 12/2011 | Hertz ...................... C09D 7/61 |
| | | 222/129 |
| 2016/0333202 A1 | 11/2016 | Okamoto et al. |
| 2017/0029635 A1 | 2/2017 | Doll et al. |
| 2017/0240459 A1 | 8/2017 | Gioffreda et al. |

FOREIGN PATENT DOCUMENTS

| | | |
|---|---|---|
| JP | 2010116549 A | 5/2010 |
| JP | 5251809 | 7/2013 |
| JP | 2013203965 A | 10/2013 |
| JP | 2014169432 | 9/2014 |
| JP | 2016-072270 A | 5/2016 |
| JP | 2016074226 | 5/2016 |
| JP | 2016165865 A | 9/2016 |
| JP | 2016165868 A | 9/2016 |
| RU | 2531174 C2 | 10/2014 |
| WO | WO 2015/157521 A1 | 10/2015 |
| WO | WO 2016/146349 A1 | 9/2016 |
| WO | WO 2017129666 A1 | 8/2017 |

* cited by examiner

IR-REFLECTIVE INK, FILM, AND TAPE

CROSS REFERENCE TO RELATED APPLICATIONS

The present application is a § 371 National Phase application based on PCT/US2018/048436 filed Aug. 29, 2018, which claims the benefit of U.S. Provisional Application Nos. 62/553,370, filed Sep. 1, 2017 and 62/669,576, filed May 10, 2018, the subject matter of each of which is incorporated by reference in their entirety.

FIELD OF THE INVENTION

The present invention is directed to inks, coatings, and substrates, such as pressure sensitive adhesive tapes, that reflect light in the near infra-red (NIR) wavelength range.

BACKGROUND OF THE INVENTION

In automated assembly operations, a device such as a robotic arm may be used to acquire a component and then position it within an article being assembled. These kinds of operations are known as pick and place manufacture. In such operations, the position of the component as it is held relative to the assembly position is an important consideration, since misalignment of one or both of the component, the article or both at the time of assembly could lead to a defect in the assembled article.

One manner in which the above problem could be addressed is through the use of an optical system that aids the robotic arm in placing the component in the correct position in the assembly. However, with such an arrangement, it may be difficult for the arm to differentiate between different aspects of the article being assembled, and/or the background against which the article has to be differentiated. This may particularly be the case when the optical system has to differentiate between objects that reflect light in the visual light range of the electromagnetic spectrum.

Pick and place manufacturing methods rely on repeated accurate placement of a part into a component. The pick and place automated system has to properly identify the edge(s) of a part in order to properly align and place it in a two or three axis coordinate system. Edge definition between the parts has to be detectable by the automated system in reference to fiducial points, such as point locations on a frame. Two parts that are similar in visual appearance may not be differentiated when sensing in the visible spectrum. This is a particular problem when a black pressure sensitive adhesive (PSA) tape part is to be placed over another black PSA tape part.

Another problem arises from the extremely small sizes of the components and the spaces in which such components are to be placed into the articles under assembly. Component parts and the articles may be only a few millimeters or even micrometers in size. Any kind of optical guide or cue that may be placed in the assembly environment must itself take up an extremely small amount of space. In particular, such a guide or cue, if placed onto a substrate of some kind, such as a tape that is then positioned on the article under assembly or in the assembly environment, must have a very small thickness, for example on the order of a few microns, perhaps no more than 20 microns, and also perhaps considerably less than 20 microns. The very small tape thicknesses referred to herein refers to the thickness of the tape, the optical cue that is deposited on the tape, and the adhesive component, and any other layers that might be present.

It is believed that there aren't any commercially available non-azo based black inks suitable for printing by gravure, flexographic or similar methods (e.g. lithography, screen, digital, etc.) that achieve a high image contrast between a surface coated with the ink and another visible black coating, when detection takes place in the near-infrared light range.

References of that may be of interest include U.S. Pat. No. 9,056,988, RU 2531174, U.S. Pat. No. 7,241,500 B2, US2016/0333202, JP2010116549, JP5251809, JP2014169432, WO2016/146349A1, US 2004/0206904 A1 EP 1469414, JP2013203965, JP2016-072270, and JP2016074226.

SUMMARY OF THE INVENTION

In one aspect, described herein are near-infrared (NIR) reflective inks that reflect light in the near-infrared portion of the electromagnetic spectrum.

In one aspect, the near-infrared (NIR) reflective inks are comprised of: (a) at least one inorganic pigment that reflects near-infrared light; (b) a polymeric resin component; and (c) a solvent.

In one aspect, wherein the at least one inorganic pigment that reflects near-infrared light is selected from an inorganic black pigment, an inorganic colored pigment, and combinations thereof.

In one aspect, the near-infrared (NIR) reflective inks form dried films or coatings when applied to substrates. The dried films or coatings reflect near-infrared light even when they have very thin coating thicknesses. For example, the amount of reflected near-infrared light makes the inks and coatings suitable for use in providing a near-infrared optical cue in the assembly operations described herein, such as in pick and place assembly operations.

In one aspect, described herein are near-infrared reflective articles comprising a dried coating prepared from the near-infrared reflective inks described herein and a substrate on which the coating is present. The substrates may be any suitable substrate material on which the inks can be printed, including paper, paperboard, polymeric materials (e.g., PET, polypropylene, polyethylene, etc.). The substrates may be in the form of a sheet, and may be a heat-dissipating sheet, a magnetic sheet, or an insulating sheet. The substrates may be formed into a plurality of layers that form a stack, such as an insulating, heat-absorbing or heat-dissipating stack of materials applied to a battery, such as a mobile phone battery.

Examples of substrate films include a polyester film, a polyethylene film, a polypropylene film, a polystyrene film, a polyimide film, and the like. Examples of metal substrates include copper foil, aluminum foil, nickel foil, iron foil, alloy foil, and the like. Further, as a composite film of a metal and a resin film, a laminate of the above resin film and a metal can be mentioned. Among these, polyester films and polyimide films excellent in strength and insulating properties are preferable.

In another aspect, the article is prepared by applying the ink by flexography, gravure, lithography, screen, and/or digital printing.

In one aspect, when applied to substrates, the near-infrared (NIR) reflective inks form dried films or coatings that exhibit reflectance values (R %) of ≥11%; preferably ≥15%; more preferably ≥20%; and still more preferably ≥25%; at a near-infrared light emission of 850 nm.

In one aspect, the dried coatings exhibiting these reflectance values, when applied to support films, e.g., substrates, have thicknesses of 1.0 μm to 200 μm, preferably 1.0 μm to 50 μm, more preferably 1.0 μm to 20 μm, still more preferably 1.0 μm to 10 μm, even still more preferably 1.0 μm to 8.0 μm, yet even still more preferably 1.0 μm to 5.0 μm, and again yet even still more preferably 1.0 μm to 3.0 μm. In one aspect, incorporative of what has been described, the support film is polyethylene terephthalate (PET) film, or another polymeric film such as polyethylene and polypropylene.

Reflectance (R %) is determined at 850 nm according to ASTM E1331-15.

CIELAB values are determined at 60° in accordance with ISO 5631-3:2008, titled "Paper and Board—Determination of Color by Diffuse Reflectance—Part 3: Indoor illumination Conditions (D50/2 degrees)".

In one aspect, described herein are near-infrared reflective tapes comprising a dried coating layer of the near-infrared inks described herein on an adhesive tape composition. The near-infrared inks and coatings may be applied to the adhesive tape composition by known printing methods. In one aspect, the near-infrared-reflective tape has a thickness of 2.0 μm to 100 μm, preferably 2.0 μm to 50 μm; more preferably 3.0 μm to 20 μm, still more preferably 4.0 μm to 10.0 μm, and event still more preferably 5 μm to 6 μm, that is, a thickness of the dried coating of near-infrared reflective ink and the adhesive tape composition, which may include support layers, such as substrate layers, and adhesive layer.

In one aspect, described herein are near-infrared light-reflective tapes comprising: a dried coating prepared from the near-infrared reflective inks described herein, the dried coating being present on a side of a support layer; and an adhesive layer applied to a side of the support layer; wherein the near-infrared-reflective tape has a thickness of 2.0 μm to 10 μm, preferably 2.0 μm to 50 μm; more preferably 3.0 μm to 20 μm, still more preferably 4.0 μm to 10.0 μm, and event still more preferably 5 μm to 6 μm.

In a particular aspect of the near-infrared light-reflective tapes the dried coating is applied to a side of the support layer. The adhesive layer is applied to another side of the support layer.

In one aspect, the near-infrared inks are applied to substrates such as adhesive tapes by printing methods such as flexography, gravure, lithography, screen, and digital printing.

In another alternative aspect of a near-infrared light-reflective tape, a near-infrared reflective pigment is mixed into an adhesive layer to provide a pigment-adhesive mixture. The pigment-adhesive mixture is applied to a side of a support layer. The near-infrared-reflective tape has a thickness of 2.0 μm to 100 μm, preferably 2.0 μm to 50 μm; more preferably 3.0 μm to 20 μm, still more preferably 4.0 μm to 10.0 μm, and event still more preferably 5 μm to 6 μm.

In yet another alternative aspect of the near-infrared light-reflective tapes, a near-infrared reflective pigment is mixed into a support layer to provide a pigment-support layer mixture. An adhesive layer is applied to a side of the pigment-support layer mixture. The near-infrared-reflective tape has a thickness of 2.0 μm to 100 μm, preferably 2.0 μm to 50 μm; more preferably 3.0 μm to 20 μm, still more preferably 4.0 μm to 10.0 μm, and event still more preferably 5 μm to 6 μm.

In yet still another particular embodiment of the near-infrared light-reflective tapes, the tape structures include a combination of two or more of the following: (1) a dried coating prepared from the near-infrared reflective inks described herein, the dried coating being present on a side of a support layer; (2) a near-infrared reflective pigment is mixed into an adhesive layer to provide a pigment-adhesive mixture that is applied to a side of a support layer; and (3) a near-infrared reflective pigment is mixed into a support layer to provide a pigment-support layer mixture, and an adhesive layer is applied to a side of the pigment-support layer mixture.

In one aspect, the near-infrared reflective tapes comprise a support layer, e.g., a substrate that may be any suitable substrate material, including paper, paperboard, polymeric materials (e.g., PET, polypropylene, polyethylene, etc.).

Other aspects of the inks, coatings, and tapes described herein will be described later in this disclosure.

DETAILED DESCRIPTION OF THE INVENTION

Definitions

Figure 1:
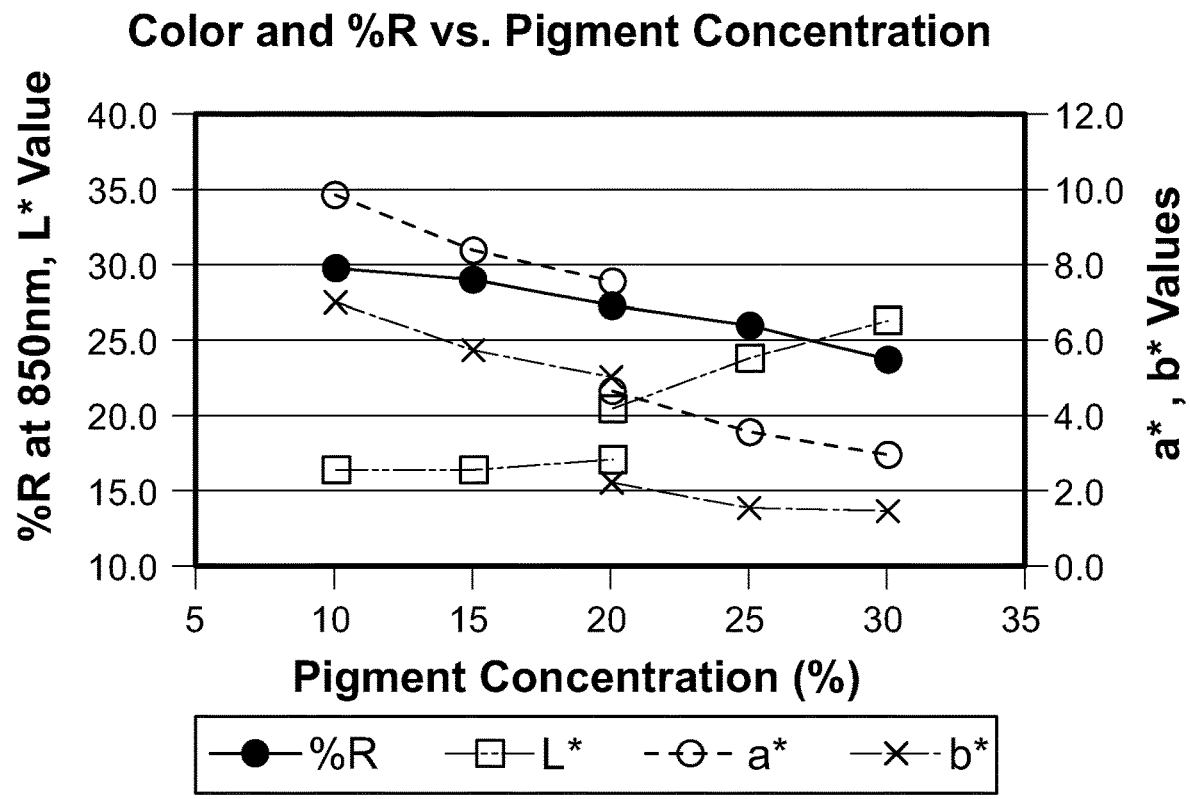
FIG. 1 is a plot of reflectance (%) at 850 nm, L value, a* value, and b* value as y-axis coordinates vs. pigment concentration as x-axis coordinates for dried coatings of near-infrared reflective inks.

As used herein, the use of the singular includes the plural unless specifically stated otherwise. For example, the singular forms "a," "an" and "the" are intended to include the plural forms, unless the context clearly indicates otherwise.

As used herein, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed", "comprised", or variants thereof are used in either the description or the claims, such terms are intended to be inclusive in a manner similar to the term "comprising".

As used herein, ranges and amounts may be expressed as "about" a particular value or range. "About" is intended to also include the exact amount. For example, "about 5 percent" means "about 5 percent" and also "5 percent." "About" means within typical experimental error for the application or purpose intended.

As used herein, the terms "polymer" and "polymers" includes homo- and co-polymers unless indicated otherwise.

Throughout this disclosure, all parts and percentages are by weight (wt % or mass % based on the total weight) and all temperatures are in ° C. unless otherwise indicated.

"Near-infrared light" or "NIR light" as the terms are used herein, refer to light in the near-infrared portion of the electromagnetic spectrum corresponding to wavelengths of 700 µm to 1400 µm. To be "near-infrared reflective" is to reflect near-infrared light as defined herein.

In one aspect, the near-infrared (NIR) reflective inks are comprised of: (a) at least one inorganic pigment that reflects near-infrared light; (b) a polymeric resin component; and (c) a solvent.

In one aspect, wherein the at least one inorganic pigment that reflects near-infrared light is selected from an inorganic black pigment, an inorganic colored pigment, and combinations thereof.

The near-infrared reflective inks described herein form dried coatings on substrates that very desirably reflect light in the near-infrared range, even when the dried coatings are very thin, e.g., on the order of 1.0 µm to 200 µm, preferably 1.0 µm to 50 µm, more preferably 1.0 µm to 20 µm, still more preferably 1.0 µm to 10 µm, even still more preferably 1.0 µm to 8.0 µm, yet even still more preferably 1.0 µm to 5.0 µm, and again yet even still more preferably 1.0 µm to 3.0 µm. In one aspect, near-infrared reflective tapes are provided that exhibit acceptable reflectivity and tape thickness, as mentioned above. Reflectivity for these coatings has been found to exceed 25% or greater at 850 nm.

In one aspect of the invention, when applied to substrates, the near-infrared (NIR) reflective inks form dried films or coatings of 0.1 µm to 5.0 µm in thickness. The coatings of this thickness exhibit reflectance values of ≥11%; preferably ≥15%; more preferably ≥20%; and still more preferably ≥25%; at a near-infrared light emission of 850 nm.

In one aspect, these reflectance values are obtained for dried films and coatings of the near-infrared reflective inks described herein as applied to PET film having a thickness of 1 µm to 200 µm.

In one aspect, a matte layer is applied over the dried films and coatings of the near-infrared reflective inks. The matte layer may be applied as an overprint varnish (OPV).

In one aspect, described herein are near-infrared reflective tapes comprising a dried coating layer of the near-infrared inks described herein on an adhesive tape composition. The near-infrared inks and coatings may be applied to the adhesive tape composition by known printing methods, such as flexography, gravure, and others. In one aspect, the near-infrared-reflective tape has a thickness of 2.0 µm to 50 µm; preferably 3.0 µm to 20 µm, more preferably 4.0 µm to 10.0 µm, and still more preferably 5.0 µm to 6.0 µm, that is, a thickness of the dried coating of near-infrared reflective ink and the adhesive tape composition, which may include support layers, such as substrate layers, and adhesive layer.

In one aspect, described herein are near-infrared light-reflective tapes comprising: a dried coating prepared from the near-infrared reflective inks described herein, the dried coating being present on a side of a support layer; and an adhesive layer applied to a side of the support layer; wherein the near-infrared-reflective tape has a thickness of 2.0 µm to 100 µm, preferably 2.0 µm to 50 µm; more preferably 3.0 µm to 20 µm, still more preferably 4.0 µm to 10.0 µm, and event still more preferably 5 µm to 6 µm. Tapes of these thicknesses may include additional tape layers.

In a particular aspect of the near-infrared light-reflective tapes the dried coating is applied to a side of the support layer. The adhesive layer is applied to another side of the support layer.

In another alternative aspect of a near-infrared light-reflective tape, a near-infrared reflective pigment is mixed into an adhesive layer to provide a pigment-adhesive mixture. The pigment-adhesive mixture is applied to a side of a support layer. The near-infrared-reflective tape has a thickness of 2.0 µm to 100 µm, preferably 2.0 µm to 50 µm; more preferably 3.0 µm to 20 µm, still more preferably 4.0 µm to 10.0 µm, and event still more preferably 5 µm to 6 µm.

In yet another alternative aspect of the near-infrared light-reflective tapes, a near-infrared reflective pigment is mixed into a support layer to provide a pigment-support layer mixture. An adhesive layer is applied to a side of the pigment-support layer mixture. The near-infrared-reflective tape has a thickness of 2.0 µm to 100 µm, preferably 2.0 µm to 50 µm; more preferably 3.0 µm to 20 µm, still more preferably 4.0 µm to 10.0 µm, and event still more preferably 5 µm to 6 µm.

It is believed that there aren't any commercially available non-azo based black inks suitable for printing by gravure, flexographic or similar methods (e.g. lithography, screen, digital, etc.) that achieve a high image contrast between a surface coated with the ink and another visible black coating, when detection takes place in the near-infrared light range. Azo-based materials cannot be included in many ink applications due to the toxicity of these materials. Thus, the inks and coatings described herein, which do not include azo-based materials, embody a solution to this problem. They attain high reflectivity with a peak around 850 nm that allow for differentiation of the edge of overlap between a non-reflective black coating or substrate, such as one using a carbon-black dye, and the inventive coatings. The NIR reflective coating can visibly appear black, and have been found to reflect 25% and more of 850 nm light at a dried coating thickness of 2.0 um.

The inks, dried coatings, and adhesive tapes described herein provide a solution to the problems discussed above regarding automated assembly operations in which a robotic device with an optical reader employed in an assembly operation may not be able to properly place a component into its proper location in the assembly, due to difficulties in optically locating the component and/or location where the part is supposed to be positioned in the assembly. This may be due to difficulties in finding component edge locations, as discussed above. In particular, the near-infrared reflecting tapes can be adhered to a component (or a surrounding location), and an optical system associated with, for example, a robotic arm, emits light in the near-infrared range, and the near-infrared reflecting tapes described herein adhered to the component reflect the near-infrared light. The optical system would then detect the reflected light and thus be able to ascertain the location of the component with a high degree of accuracy. This results in an improvement in the quality of the assembly process and the assembled components (e.g., less component defects should occur when assembly accuracy is improved and made consistent).

Further, the near-infrared reflective tapes described herein advance the art (and solve a problem) by providing useful optical markers (e.g., reflectors of light, such as near-infrared light) while having very thin structures. The tapes exhibit suitable reflectance (e.g., the reflectance values described herein) while being small and thin enough to be placed into extremely small and/or tight locations and spaces often encountered in manufacturing processes. Such near-infrared reflective tapes are suitable for use in assembly operations in which very small components are assembled, such as in the electronics industry (e.g., desktop and laptop computers, hard drives, servers, mobile phones, tablets, televisions, appliances, automotive components, to name just a few possibilities).

Further, since the tapes reflect near-infrared light, the infrared reflectance allows for the optical reader to easily differentiate the object having the tape adhered thereto from other objects within the reader's field of vision. For example, an optical reader would be able to differentiate between the object with the tape, which reflects NIR light, and objects that only reflect visible light.

Such near-IR reflective tapes are suitable for use in pick and place assembly operations The present inventors are not aware of any known near-infrared tapes that exhibit such a combination as described above, such as for example a tape thickness of 2.0 µm to 50 µm; preferably 3.0 µm to 20 µm, more preferably 4.0 µm to 10.0 µm, and still more preferably 5 to 6 µm that accounts for all tape layers (e.g., adhesive, near-infrared reflective coating, support layer).

In one aspect, the near-infrared reflective tape may comprise (a) a dried coating of infrared-reflective coating; (b) a layer of substrate material; and (c) an adhesive layer. The coating (a) may be 2 µm in thickness. Substrate layer (b) may be (i) 2 µm in thickness; (ii) comprised of PET; and/or (iii) transparent. A combination of some or all of these characteristics may be employed in the polymeric substrate material middle layer. Adhesive layer (c) may be (i) 1 to 2 µm in thickness and/or (ii) transparent.

The near-infrared reflective ink of the present invention is preferably printed by gravure or flexography onto a transparent PET to form a black or visually close-to black coating layer, though other print methods are also possible (e.g. litho, screen, digital, etc.). In one embodiment, the ink is gravure printed onto substrates that are used in automated pick and place manufacturing systems. In this manner, the near-infrared reflective tape can be differentiated in a stack that also contains tapes that reflect an identical or near-identical color in the visible light range.

In one aspect, the amount of inorganic black pigment in the near-infrared reflective inks described herein is 5 wt % to 50 wt %, preferably 5 wt % to 25 wt %, and more preferably with the most preferred ranged from 5 wt % to 15 wt %, based on the total weight of the ink.

In one aspect, the near-infrared reflective inks described herein include inorganic black pigment selected from chromium iron oxide, chromium iron nickel oxide, copper chromite, iron chromite, manganese ferrite, nickel manganese iron oxide, non-IR reflective inorganic black pigments, non-azo-based organic black pigments, and combinations thereof.

In one aspect, it is preferred that the inks and coatings include at least one inorganic black pigment that reflects light in the near-infrared range.

In one aspect, the inorganic black pigment is selected from pigments available under the trade names BK® 10P950 and SICOPAL® Black L0095, respectively available from Shepherd Color Company and BASF. BK®10P950 is also known as C.I. Pigment Brown 29 and is further identified by Shepherd under CAS number 12737-27-8 (chromium iron oxide). BASF describes SICOPAL®

Black L0095 as Pigment Brown 29 and as Fe/Cr oxide. Combinations of these pigments can be used.

Chromium iron oxide pigments may be preferred as the inorganic black pigment that reflects near-infrared light.

In one aspect, the amount of inorganic colored pigment in the near-infrared reflective inks described herein is 2.0 wt % to 20 wt %, preferably 2.0 wt % to 15.0 wt %, more preferably 2.0 wt % to 10 wt %, based on the total weight of the ink.

In one aspect, the pigment:resin ratio of the inks is 0.1 to 10, preferably 0.5 to 5.0.

In one aspect, the near-infrared reflective inks described herein include inorganic colored pigment selected from bismuth vanadate, chrome antimony titanate, chromium oxide, cobalt aluminate, cobalt chromite, cobalt chromium aluminate, cobalt lithium aluminate, cobalt titanate, iron chromite, iron titanium chromite, lead chromate, manganese antimony titanate, manganese titanate, nickel antimony titanate, nickel titanate, niobium tin pyrochlore, tin zinc, titanium oxide, zinc ferrite, zinc iron chromite, non-IR reflective inorganic colored pigments and non-azo-based organic colored pigments.

In one aspect, the inorganic colored pigment is selected from pigments having the trade names GREEN30C654 and BLUE211, and may be noted herein as GR30C654 and BL211. These pigments are available from the Shepherd Chemical Company. GR30C654 is described by Shepherd as C. I. pigment green 17 with CAS number 1308-38-9 (chromium III oxide). BL 211 is described by Shepherd as C.I. blue 36, believed to be a cobalt chromite blue.

In one aspect, it is preferred that the inks and coatings include at least one inorganic colored pigment that reflects light in the near-infrared range.

In one aspect, it is preferred that the inks and coatings include at least one inorganic black pigment that reflects light in the near-infrared range and at least one inorganic colored pigment that reflects light in the near-infrared range.

Other exemplary inorganic pigments that can be obtained through commercial channels include, but are not limited to, the following that are infrared reflective:

Black pigments: $CrFeO_3$ and $FeCr_2O_4$, for example, Heucodur Black HD940 from Heubach, Sicopal Black K 0095, L 0095, and Paliogen Black L 0086 from BASF, BK 10P950, BK 10P923, BK 30C941, and BK10P952 from Shepherd Color, Ferro Cool Color V-760, 10202, and 10466 black pigment, and Colanyl Oxide Black IR 500 pigment.

Blue pigments include Co/Al/Cr-oxide and Cobalt blue, for example, Heucodur IR Blue 550 from Heubach, Sicopal Blue K 6310 from BASF, Shepherd Color BL 211, and Clariant Blue COR 530.

Green pigments include Cr(III) oxide, for example, Heucodur IR Green 5G from Heubach, Sicopal Green K 9710 from BASF, Shepherd Color GR 30C654, and Ferro Cool Color 10241 and 4010 pigment, and Clariant Green G 530 pigment.

Other colored pigments may be used, for example purple, red, yellow, orange, light green, and white IR-reflective inorganic oxide materials could be used in the near-infrared reflective inks described herein. Some solvent dye such as Keyfast Spirit Blue 6G-SS from Milliken & Company could be used to obtain suitable L, a*, b* color values.

In one aspect, one or both of the inorganic black pigment and the inorganic colored pigment are milled prior to inclusion in the near-infrared inks described herein. Milling may have beneficial effects, such as reducing pigment particle size, reducing surface roughness, and improving the uniformity of ink laydown. Milled inks have been found to have an ink laydown per print pass of 1 µm or less.

An important aspect as it relates to milling of the pigments is that the inorganic black and colored pigments found suitable for inclusion in the inks described herein are, in many instances, dense metal-containing pigments. Such pigments have a generally wide use in the plastics industry, that is, they are compounded into plastic resins and then formed into various articles. However, these pigments have not heretofore been included in ink compositions due to the difficulties associated with their relatively large particle size. The density of these pigments is also a factor as it may lead to precipitation out of the ink. Further, such pigments increase the surface roughness to relatively high values when they are included in inks and formed into coatings. They also can cause the ink laydown to be inconsistent when included, which results in the formation of a poor quality ink layer and/or dried coating on the printed substrate.

The present disclosure includes examples that describe the milling of the inorganic pigments used in the inks described herein. The examples demonstrate several different techniques that have been found to be effective in making the pigments suitable for inclusion in stable ink formulations. Inks including the milled pigments form dried coatings that are very thin (on the order of a few micrometers, as described herein) that reflect near-infrared light in the amounts described herein. Further, as demonstrated herein, the inks and dried coatings are black, or visually close to black. As such the inks are suited for use in industrial applications, since the infrared light reflected by the coatings is of an easily-detectable quantity.

The near-infrared inks described herein immediately dry upon printing. Coatings that include 20 wt % inorganic pigment loads that are about 2 um thick have a wet laydown of approximately 8.2 $g/m^2$ and a dry laydown of 2.9 $g/m^2$. The dry laydown per print pass depends on the anilox used. Samples discussed herein were printed with a 150P (pyramid) anilox with dimensions 38 um (depth)×135 um (length)×135 um (width).

In the examples that follow, ink laydown of less than 1 µm per coating pass means that the total thickness of, for example, a dried coating prepared from four (4) printing passes, will be less than 4 µm, due to the aforementioned ink laydown thickness of less than 1 µm per coating pass, and the evaporation of the solvent in the ink after printing.

In one aspect, the amount of resin present in the near-infrared reflective inks described herein is 1.0 wt % to 35 wt %, preferably 5.0 wt % to 20 wt %, more preferably 9.0 wt % to 16 wt %, based on the total weight of the ink.

In one aspect, the amount of solvent present in the near-infrared reflective inks described herein is 5.0 wt % to 80 wt %, preferably 5.0 wt % to 65 wt %, more preferably 40 wt % to 76 wt %, still more preferably 45 wt % to 55 wt %, based on the total weight of the ink.

In one aspect, the near-infrared reflective inks further comprises additives commonly used in the field, such as rheology-modifiers, dispersants, defoaming agents, matting agents, adhesion promoters, waxes, surfactants, hardening agents, and combinations thereof.

In one aspect, the near-infrared reflective inks are free of azo-based compounds. Azo-based compounds are known to be toxic to humans; thus inks free of azo-based compounds provide an important health and safety benefit.

In one aspect, the near-infrared reflective inks are free of triblock polymers.

In one aspect, dried coatings comprised of the near-infrared reflective inks described above have thicknesses of 1.0 µm to 200 µm, preferably 1.0 µm to 50 µm, more preferably 1.0 µm to 20 µm, still more preferably 1.0 µm to 10 µm, even still more preferably 1.0 µm to 8.0 µm, yet even still more preferably 1.0 µm to 5.0 µm, and again yet even still more preferably 1.0 µm to 3.0 µm.

In one aspect, dried coatings are comprised of the near-infrared reflective inks described above which include pigments exhibiting low hue colors with L* values below 45. These colors would be other than black, such as, for example, brown, green, darker blues. Following the CIELAB color space, these colors may comprise any a* and b* values with an L* value below 45.

In one aspect, the dried coatings comprised of the near-infrared reflective inks described above, at coating thicknesses of 0.1 µm to 5 µm, have a reflectance of ≥11%; preferably ≥15%; more preferably ≥20%; and still more preferably ≥25%; at a near-infrared light emission of 850 nm.

In one aspect, the dried coatings exhibiting these reflectance values have been applied to support films having a thickness of 1.0 µm to 200 µm, preferably 1.0 µm to 50 µm, more preferably 1.0 µm to 20 µm, still more preferably 1.0 µm to 10 µm, even still more preferably 1.0 µm to 8.0 µm, yet even still more preferably 1.0 µm to 5.0 µm, and again yet even still more preferably 1.0 µm to 3.0 µm. In one aspect, incorporative of what has been described, the support film is polyethylene terephthalate (PET) film, or another polymeric film such as polyethylene and polypropylene.

In one aspect, the dried coatings comprised of the near-infrared reflective inks described above have CIELAB values of: L=15 to 36, a*=−3.5 to 10, b*=−3.5 to 8.

In a preferred aspect, the dried coatings comprised of the near-infrared reflective inks described above have CIELAB values of: L=16 to 36, a*=−3 to 3, b*=−3 to 3.

In a more preferred aspect, the dried coatings comprised of the near-infrared reflective inks described above have CIELAB values of: L=25.0±5, a*=0±2.5, b*=−1±2.5.

In a more preferred aspect, the dried coatings comprised of the near-infrared reflective inks described above have CIELAB values of: L=22.5±5, a*=0±2, b*=−1±2.

In a still more preferred aspect, the dried coatings comprised of the near-infrared reflective inks described above have CIELAB values of: L=22.5±5, a*=0±1, b*=−1±1.

In one aspect, the dried coatings comprised of the near-infrared reflective inks described above have a 60° gloss of ≤12, preferably ≤10, more preferably 0 to 10, still more preferably 0 to 5, and even still more preferably 0 to 4. Gloss is determined in accordance with ISO 2813:2014.

In some embodiments, the adhesive tapes described herein include a support layer (e.g., substrate) and an adhesive layer. The dried coating of near-infrared reflective ink may be applied to a side of the support layer, and an adhesive material may be applied to the other side of the support layer. The support layer may be a polymeric material, such as, for example, a polymer film of PET, glycol modified PET (PET-G), polyethylene, and polypropylene. In a preferred aspect, the polymeric support layer is PET.

In one aspect, the adhesive tape is a pressure sensitive adhesive tape.

In one aspect, the tape structures may have the following layer thicknesses:

An optional matte layer: 0.50 to 4.0 µm, more preferably 0.75 to 3.0 µm, and most preferably 1.0 to 2.0 µm.

Dried ink (i.e., dried coating) layer: 1.0 µm to 10.0 µm, preferably 1.0 µm to 8.0 µm, more preferably 1.5 µm to 3.0 µm, and still more preferably 2.0 µm to 2.5 µm;

Polymeric support layer, e.g., a substrate layer: 0.5 µm to 100 µm, preferably 0.5 µm to 20 µm, more preferably 1.0 µm to 12.0 µm, and still more preferably 1.5 µm to 2.5 µm;

Adhesive layer, e.g., an acrylic adhesive layer: 1 µm to 50 µm, preferably 0.5 µm to 10 µm, more preferably 1.0 µm to 3.0 µm.

Figure 9A:
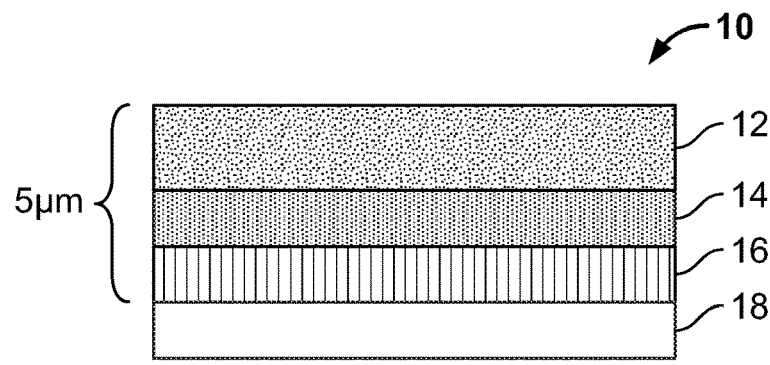
FIG. 9A is a cross-sectional view of a first embodiment of a near-infrared tape configuration in accordance with the present disclosure.

In one embodiment of a near-infrared reflective tape shown in FIG. 9A, tape structure 10 is comprised of a dried coating of near-infrared reflective ink 12 applied to support layer 14 e.g., substrate 14, which for example may be a polymeric film such as PET. A pressure sensitive adhesive layer 16, such as an acrylic adhesive, is applied to the substrate layer 14 on the side opposite the coating 12. A removable release liner 18 may be applied over the adhesive layer 16. The removable release liner 18 is removed just before the near-infrared reflective adhesive tape 10 is applied to a surface. This arrangement is shown in FIG. 9A, which employs a PET film as a polymeric support layer. As shown, the thickness of the near-infrared reflective tape is 5 µm, not including release liner 18. The dried coating layer 12 may be 15 µm to 5 µm thick.

A suitable release liner is a film available under the trade name PET 38×1 K 0, available from by Nippa Corporation.

The total thickness of the near-infrared reflective adhesive tape may be 2.0 µm to 100 µm, preferably 2.0 µm to 50 µm; more preferably 3.0 µm to 20 µm, still more preferably 4.0 µm to 10.0 µm, and event still more preferably 5 µm to 6 µm, that is, a thickness of the dried coating of near-infrared reflective ink and the adhesive tape composition, which may include support layers, such as substrate layers, and adhesive layer. Within this range, mechanical strength, thinness and adhesive strength in the case of protecting the functional sheet for electronic parts are easily compatible. The total thickness of the black adhesive tape is the total thickness of the black adhesive tape not including the release liner.

In one aspect, the dried coating layer 12 may be black or visually close to black.

Figure 9B:
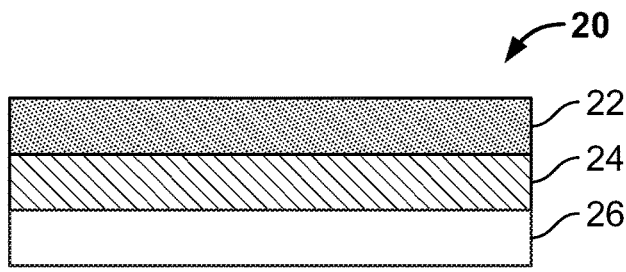
FIG. 9B is a cross-sectional view of a second embodiment of a near-infrared tape configuration in accordance with the present disclosure.

In another embodiment of a near-infrared reflective tape structure 20 that is shown in FIG. 9B, a near-infrared reflective pigment is mixed with the adhesive layer and the pigment-adhesive mixture 24 is applied to one side of the support layer 24 e.g., substrate 24, which may be a PET film. A removable release liner 26 is applied over the pigment-adhesive mixture 24. The removable release liner 26 is removed just before the near-infrared reflective adhesive tape 20 is applied to a surface.

Figure 9C:
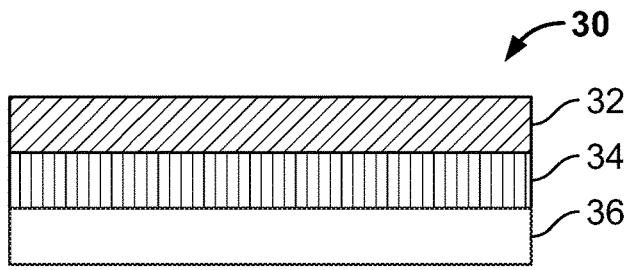
FIG. 9C is a cross-sectional view of a third embodiment of a near-infrared tape configuration in accordance with the present disclosure.

In another embodiment of a near-infrared reflective tape structure 30 that is shown in FIG. 9C, a near-infrared reflective pigment is mixed together with the substrate to provide a pigment-containing substrate layer 32. An adhesive layer 34 is applied to one side of pigment-containing substrate layer 32. A removable release liner 36 is applied over the adhesive layer. The removable release liner 36 is removed just before the near-infrared reflective adhesive tape 30 is applied to a surface.

Figure 9D:
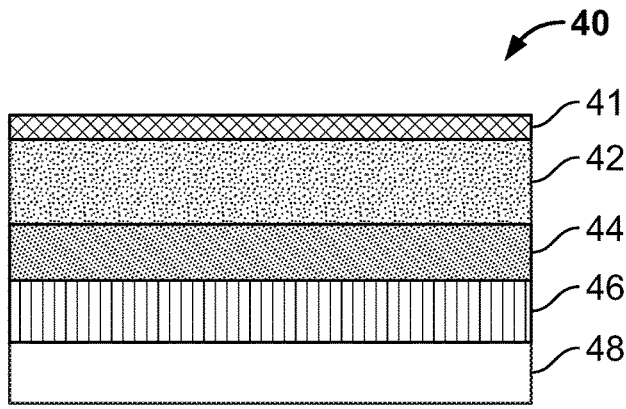
FIG. 9D is a cross-sectional view of a fourth embodiment of a near-infrared tape configuration in accordance with the present disclosure.
Figure 10A:
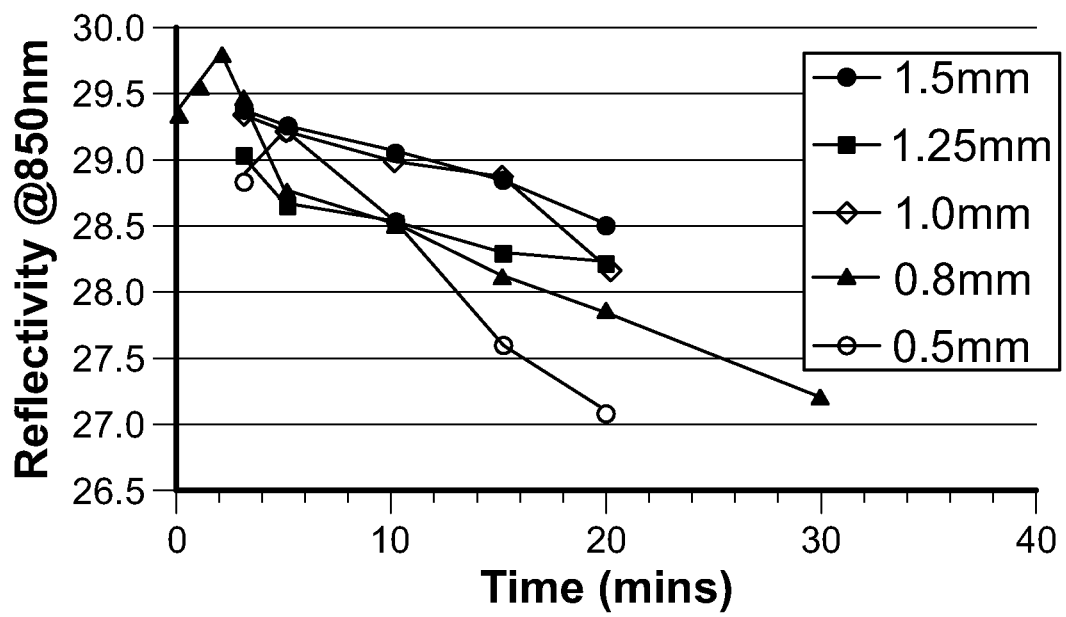
FIG. 10A is a plot of reflectivity @850 nm vs. pigment time milled (mins) for dried coatings of ink samples in which pigments were milled with media of different sizes (1.5 mm, 1.25 mm, 1.0 mm, 0.8 mm, and 0.5 mm)
Figure 10B:
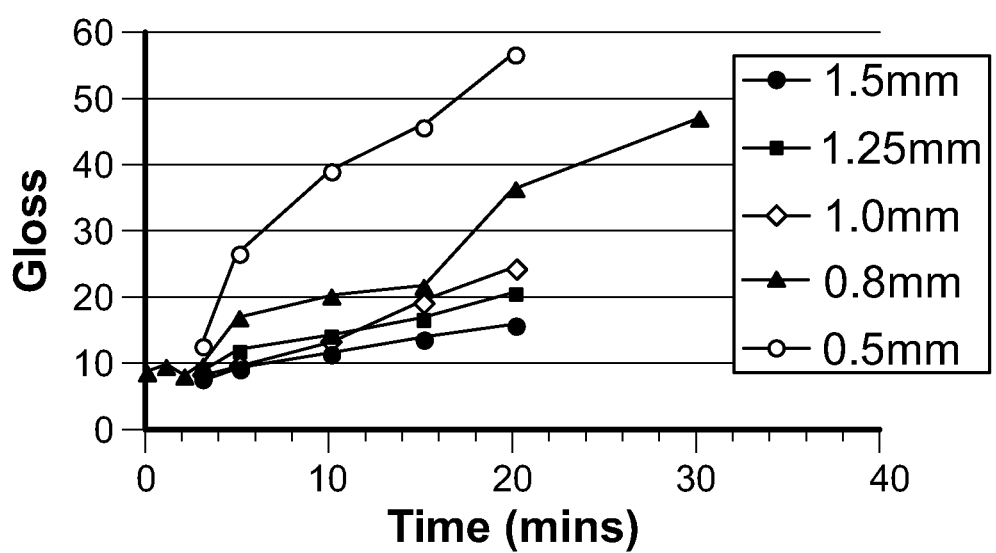
FIG. 10B is a plot of gloss vs. pigment time milled (mins) for dried coatings of ink samples in which pigments were milled with media of different sizes (1.5 mm, 1.25 mm, 1.0 mm, 0.8 mm, and 0.5 mm)
Figure 10C:
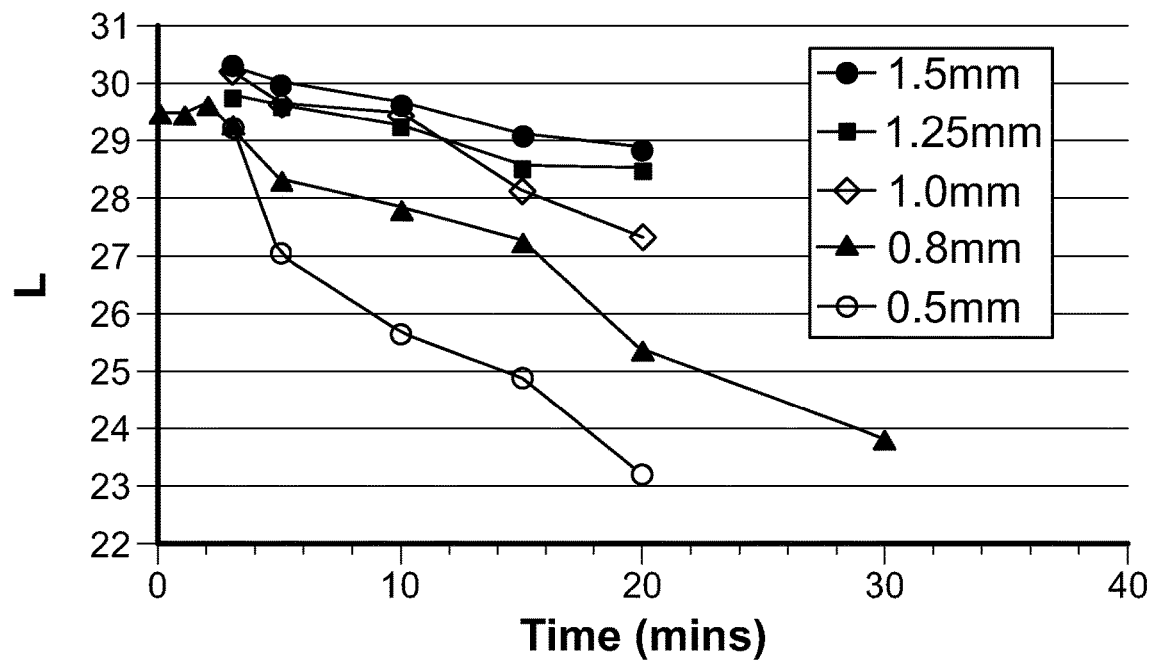
FIG. 10C is a plot of L value vs. pigment time milled (mins) for dried coatings of ink samples in which pigments were milled with media of different sizes (1.5 mm, 1.25 mm, 1.0 mm, 0.8 mm, and 0.5 mm)
Figure 10D:
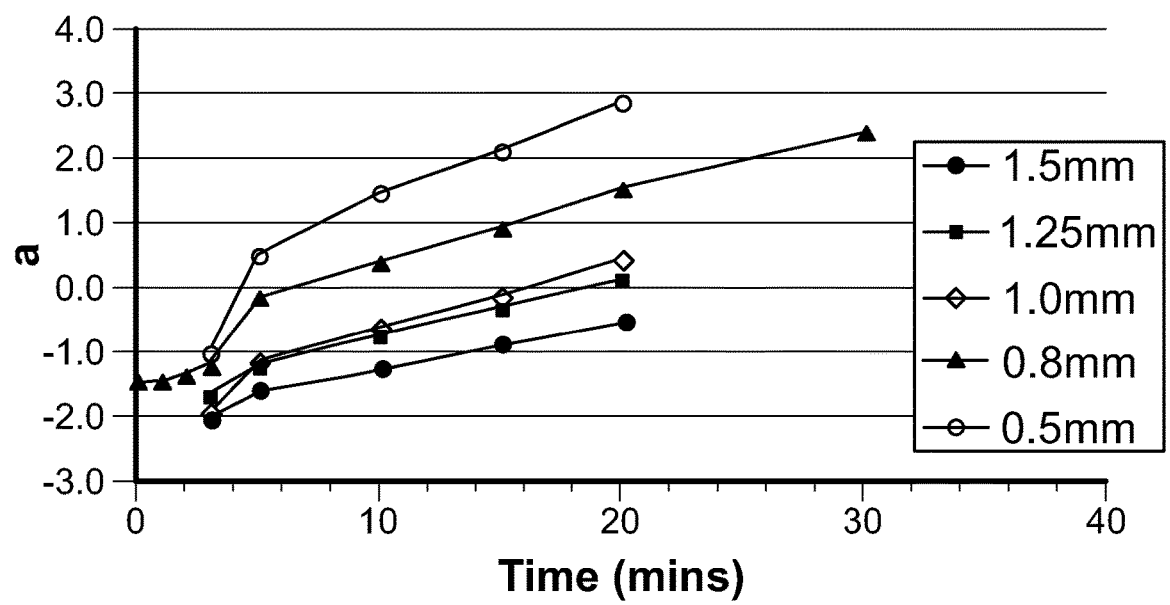
FIG. 10D is a plot of a* value vs. pigment time milled (mins) for dried coatings of ink samples in which pigments were milled with media of different sizes (1.5 mm, 1.25 mm, 1.0 mm, 0.8 mm, and 0.5 mm)
Figure 10E:
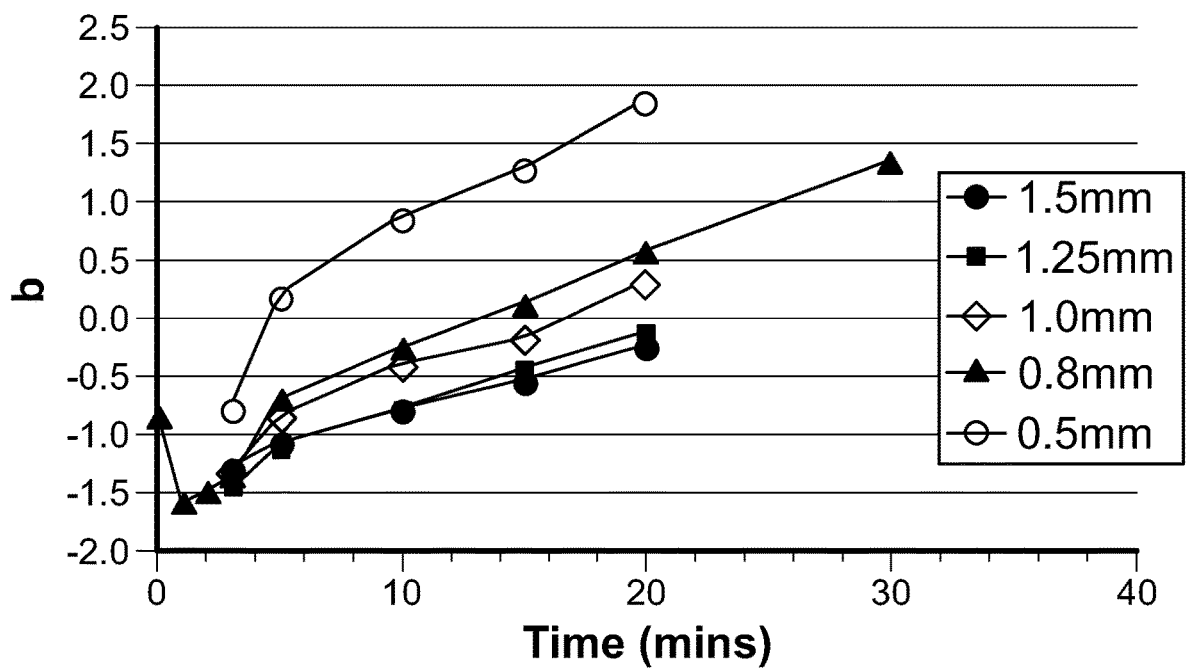
FIG. 10E is a plot of b*value vs. pigment time milled (mins) for dried coatings of ink samples in which pigments were milled with media of different sizes (1.5 mm, 1.25 mm, 1.0 mm, 0.8 mm, and 0.5 mm)
Figure 11A:
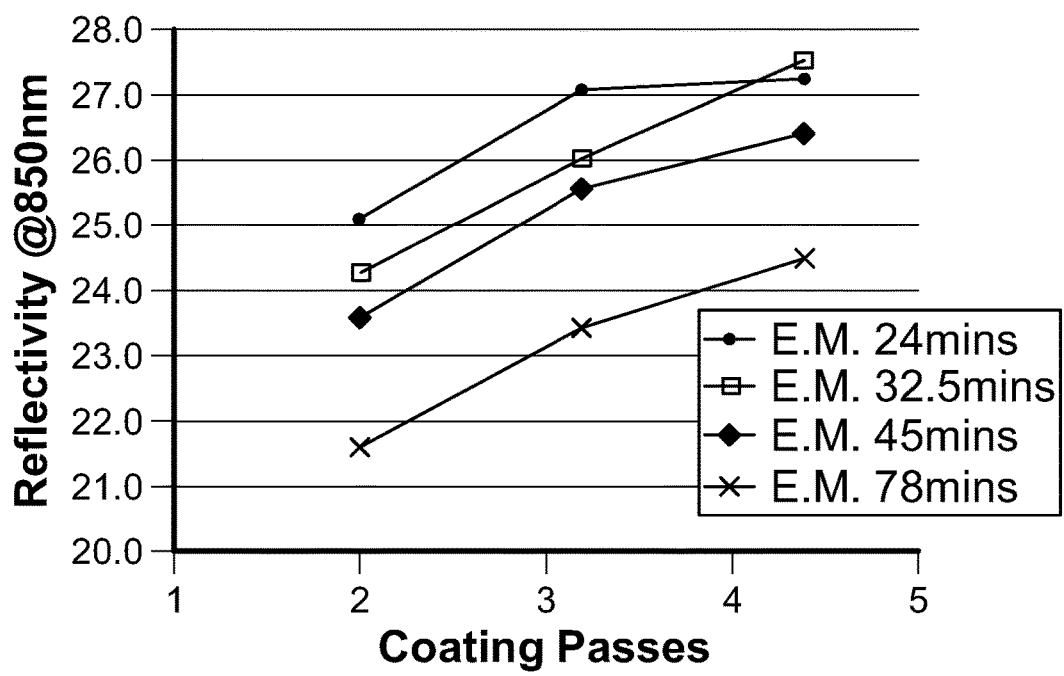
FIG. 11A is a plot of reflectivity (%) at 850 nm for dried coatings of ink samples applied in 2, 3 and 4 printing passes in which pigments have been milled for 24, 32.5 and 45 and 78 minutes.
Figure 11B:
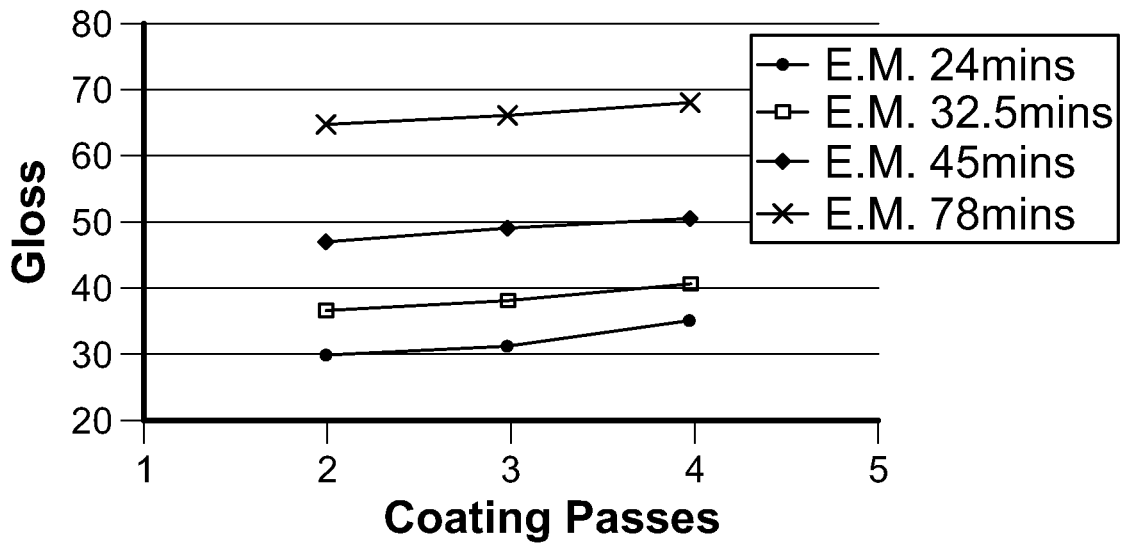
FIG. 11B is a plot of gloss for dried coatings of ink samples applied in 2, 3 and 4 printing passes in which pigments have been milled for 24, 32.5 and 45 and 78 minutes.
Figure 11C:
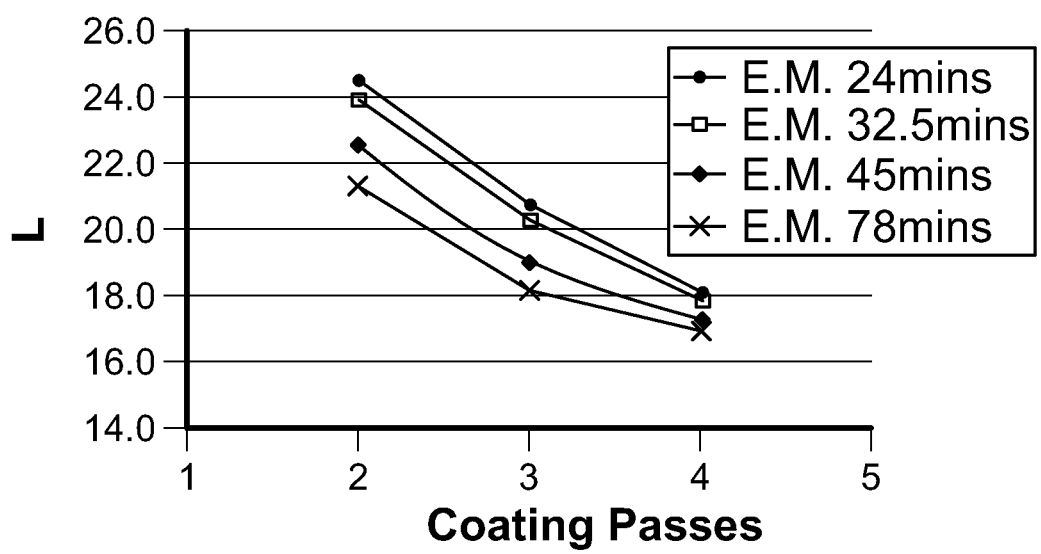
FIG. 11C is a plot of L value for dried coatings of ink samples applied in 2, 3 and 4 printing passes in which pigments have been milled for 24, 32.5 and 45 and 78 minutes.
Figure 11D:
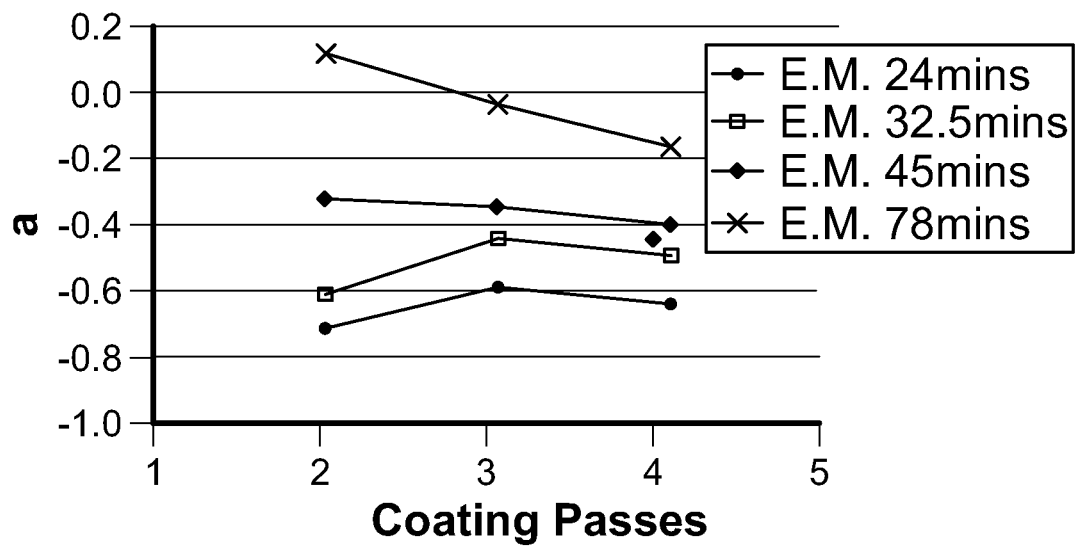
FIG. 11D is a plot of a*value for dried coatings of ink samples applied in 2, 3 and 4 printing passes in which pigments have been milled for 24, 32.5 and 45 and 78 minutes.
Figure 11E:
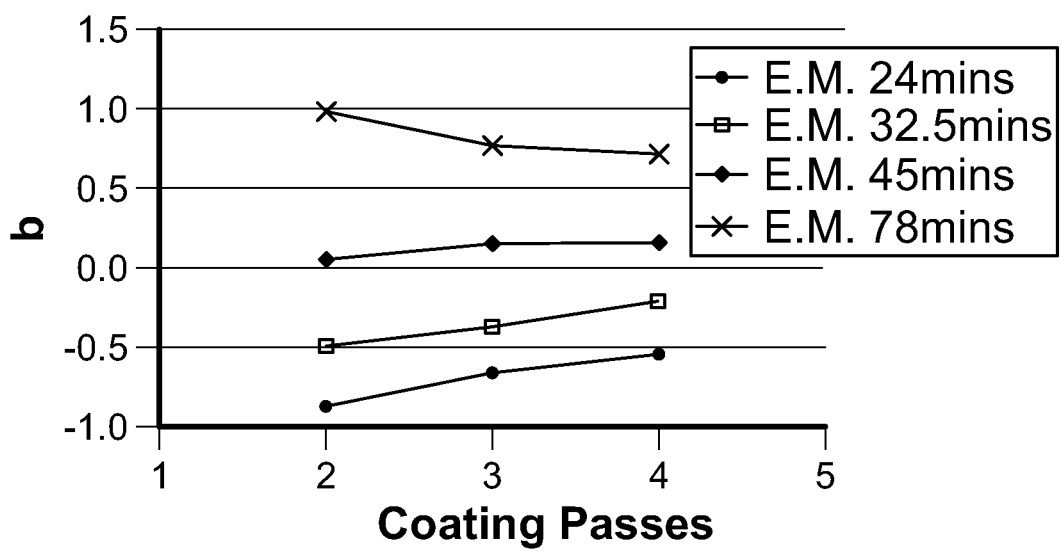
FIG. 11E is a plot of b*value for dried coatings of ink samples applied in 2, 3 and 4 printing passes in which pigments have been milled for 24, 32.5 and 45 and 78 minutes.

In another embodiment of a near-infrared reflective tape structure 40 that is shown in FIG. 9D, tape structure 40 is comprised of a matte layer 41 over a dried coating of near-infrared reflective ink 42. The matte layer 41 includes an overprint varnish that includes a matting agent. The dried coating layer 42 was applied as an ink to support layer 44, e.g., substrate 44, which for example may be a polymeric films such as PET. A pressure sensitive adhesive layer 46, such as an acrylic adhesive, is applied to the substrate layer 44 on the side opposite of coating 42. A removable release liner 48 may be applied over the adhesive layer 46. The removable release liner 48 is removed just before the near-infrared reflective adhesive tape 10 is applied to a surface. The FIG. 9D tape structure employs a PET film as a polymeric support layer. The thickness of the layers has been found to be as follows: Matte layer 1.5 µm; dried coating layer 2.3 µm; PET support layer 3.5 µm, adhesive layer 1.5 µm Total thickness: 10.0 µm.

In yet still other particular embodiments of the near-infrared light-reflective tapes based on the embodiments of FIGS. 9A-9D, the tape structures include a combination of two or more of the following: (1) a dried coating prepared from the near-infrared reflective inks described herein, the dried coating being present on a side of a support layer; (2) a near-infrared reflective pigment is mixed into an adhesive layer to provide a pigment-adhesive mixture that is applied to a side of a support layer; and (3) a near-infrared reflective pigment is mixed into a support layer to provide a pigment-support layer mixture, and an adhesive layer is applied to a side of the pigment-support layer mixture.

Polyester film F53 Lumirror #3.5 (thickness: 3.5 µm) manufactured by Toray Industries, Inc., is a suitable substrate that can be used in preparing the near-infrared reflective substrates and adhesive tapes in accordance with the present principles.

The matte layer may be prepared from a surface treating agent containing a matting agent (that is, a delustering agent) in which fine particles of silica, calcium carbonate, barium sulfate or the like is dispersed in a resin binder and applied to the outermost surface side of the near-infrared reflective sheet or tape. The matte layer may be applied by known printing methods such as letterpress printing, flexographic printing, dry offset printing, gravure printing, gravure offset printing, offset printing, screen printing, and the like. OS-M Suedo OP varnish, available from Dainichi Seika Co., Ltd., is a suitable commercially available overprint varnish to which the matting agent may be added. Upon drying, e.g., at 100° C. for 1 minute and aged at 40° C. for 2 days the matte layer has a thickness of 1.5 µm.

The 9D tape structure was prepared and found to have R % of 30.7 at 850 nm. The dried coating thickness was 2.3 µm. L, a*, b* were 28.0, 0.6, and 0.1 respectively.

In one aspect, the near-infrared inks are applied to substrates, including the adhesive tapes, by printing techniques such as flexo, gravure, lithography, screen, and digital. As a general matter, ink viscosity is modified depending on the printing requirements. For example, viscosity may be as low at 1 cps for flexographic printing methods and as high as 200,000 cps for screen printing. Acceptable ink viscosities include 10-80 cps for lithography and flexographic, 20-100 cps for gravure, and 15,000 to 200,000 cps for screen print.

The pressure sensitive adhesive layer can be formed by applying a pressure sensitive adhesive on a release liner. Examples of the coating method include letterpress printing, flexographic printing, dry offset printing, gravure printing, gravure offset printing, offset printing, screen printing, and the like. The most preferable for coating a thin film is gravure printing.

Many different pressure sensitive adhesives can be used. The pressure sensitive adhesive may be selected from, for example, acrylic pressure sensitive adhesives, rubber pressure sensitive adhesives, silicone pressure sensitive adhesives, urethane pressure sensitive adhesives, polyester pressure sensitive adhesives, styrene-diene block copolymer type pressure sensitive adhesives, vinyl alkyl ether type pressure sensitive adhesives, polyamide type pressure sensitive adhesives, fluorine type pressure sensitive adhesives, crepe property improving type pressure sensitive adhesives, radiation-curable pressure sensitive adhesives. Combinations of two or more pressure sensitive adhesives can be used.

An acrylic pressure sensitive adhesive may be preferred for its high adhesion reliability. The acrylic pressure sensitive adhesive can be obtained by using an acrylic polymer as a pressure sensitive component or a main agent and, if necessary, appropriately adding a crosslinking agent, a tackifier, a softener, a plasticizer, a filler, and/or an antioxidant, Additives may be included. The acrylic polymer may be a polymer containing an alkyl (meth) acrylate ester as a main monomer component, and can be copolymerized with a (meth) alkyl ester, if necessary, in the presence of a copolymerizable monomer as an active ingredient.

The mass average molecular weight (Mw) of the acrylic polymer may be 500,000 to 1,200,000, preferably 500,000 to 1,000,000. Within these ranges, sufficient adhesiveness and heat resistance can be easily developed for a thin film.

The near-infrared reflective inks described herein employ inorganic pigments to achieve a black or visually close to black coating (as described herein with respect to the CIELAB color space) while state of the art coatings require a tri-color pigment system or hazardous azo-based organic pigment. Further the present near-infrared reflective inks do not require a tri-block dispersant to attain the stability of the ink.

Dried coatings prepared from the near-infrared reflective inks described herein provide edge definition to a part or component on which the dried coating is present (either as a coating directly applied to the part or as a near-infrared reflective adhesive tape as described herein). Edge definition can be perceived when the dried coating is exposed to IR light and viewed, sensed, and or optically read in the infrared wavelength range. The dried coating preferably may have a thickness of 0.1 to 5 µm and may be printed on paper, polymer film, glass or other substrates. The coating imparts a total reflectivity (hemispherical reflectance at 850 nm—that is, where light is reflected into a sphere and collected) that is preferably 20% greater than similarly colored parts. This IR-reflective coating functions to provide edge definition between similarly colored substrates.

The present invention provides a composition and process for making a black or visibly dark coating (e.g., visually close to black) that reflects near-infrared wavelengths. Providing a visibly dark color with high reflectance in the near-infrared wavelength region on a thin film coating, such as may be present on a PSA tape, is not believed to be known in the art.

A black inorganic oxide pigment such as chromium iron oxide can be included in the inks and coatings to achieve high reflectance in the NIR region. Chromium iron oxide is the preferred black inorganic oxide pigment). At a dry thickness of 2 µm, the coating can preferably have a CIELAB L* value of 15 to 36 while reflecting 25% or more of 850 nm light.

It should be understood that the near-infrared reflective inks described herein are fluids, and after the inks are printed or applied to a substrate, such as a support layer or PSA tape, they dry to form the coatings that include the inorganic black and colored pigments found in the inks, which contribute to the optical properties of the dried coatings described herein.

The inks and coating described herein are particularly useful in packaging applications in which one black component is to be machine positioned onto another black component in forming a stacked device. An automated placement system would have to differentiate between the edges of the two or more components in order to operate effectively, e.g., operate within a tolerable range of error. By employing the near-infrared reflective inks and coatings described herein with an infrared sensing camera and infrared lighting system (i.e., infrared light source), the automated system can differentiate a component or part or frame or other item that has a near-infrared reflective coating, which for example may be black, from another component that is black and which does not reflect light in the near-infrared range.

In one preferred aspect, the dried coatings described herein are highly reflective of near-infrared light. For example reflectance of ≥25% at 850 nm is preferred. One reason is that the amount of direct light reaching the camera sensor decreases with distance, per the inverse square law.

Additional components may be included in the near-infrared reflective inks. Such other components include, for example organic pigments or dyes (which may not necessarily be IR-reflective), dispersing agents, defoaming agents, matting agents, waxes and other materials that can be used modify the printing parameters and/or performance specifications (color, coefficient of friction, gloss, rub-resistance, adhesion etc.) of the ink.

The near-infrared reflective inks and coatings described herein are compatible with other ink and coating layers that may be applied to the substrate. For example, the inks and coatings may be over-coated with a coating that does not contain IR reflective pigments but rather contains components that impart desired characteristics, such as color, coefficient of friction, gloss, rub-resistance, adhesion etc.

The near-infrared reflective inks and coatings described herein may include black and colored inorganic oxide pigments. A mixed pigment selection (e.g., black and colored pigment mixture) has been found to attain effective differentiation between materials that are not IR reflective and coatings that are IR reflective. Color can be adjusted by adding other pigment materials that change the appearance in the visual spectrum along the darkness axis, yellow-blue axis or the green-red axis (i.e., the L, a*, and b* axes of the CIELAB color spectra).

Similarly, for color adjustment purposes, dyes and organic pigments that are not reflective in the near IR range can be also included in the inks in addition to the inorganic IR reflective pigments. Non-IR reflective pigments are preferably included in the near-infrared reflective inks in amounts of ≤20 wt % of the total weight of the ink compositions, more preferably ≤15 wt %, more preferably ≤10 wt % and most preferably ≤wt 5%.

Resins and solvents deliver the desired settling and flow properties to the described inks, which aid in obtaining an even laydown across a substrate. Multiple resins can be included in the inks, with the understanding that the resins should be compatible with the one or more solvents in the ink (i.e., the solvent system).

The solvent system is a solution of one or more solvents. Compatible resins readily dissolve in the solvent system, and maintain solubility in the ink formulation through the printing process. Suitable solvents include but are not limited to ethanol, methanol, methyl acetate, n-propyl acetate, ethyl acetate, isopropyl acetate, isopropanol, acetone, Methyl Isoamyl Ketone, n-Butyl Acetate, PM Acetate, and combinations thereof.

Suitable resins include, for example, vinyl-based, polyester-based and/or cellulose-based resins. The resins should be compatible with the solvents used in gravure inks, flexographic inks, and solvents used in inks for whatever printing method is contemplated.

The examples below are based on polyvinyl butyral resin, but this is merely exemplary and it is understood that the resin system is not limited to this class and could include any resin or blends of resins that impart good adhesion properties to the intended substrate. Examples of further resins that could be suitable include alkyds, phenolics, nitrocellulose, polyamides, vinyls, acrylics, rosin esters, hydrocarbons, urethanes, epoxies, polyesters, styrenes, ureas, melamine-formaldehydes, and combinations thereof.

The inks should exhibit good adhesion to likely substrate materials such as plastics and glass. In this regard, the resin or resins in the inks are preferably thermoplastic polymer resins, in contrast to thermosetting polymer resins. It is also preferred that the resin should not absorb IR light, especially IR light with wavelength of 850±100 μm.

As obtained from commercial suppliers, the particle sizes of the inorganic pigment materials used in the described near-infrared inks and coating described herein may be too large to print thin coatings using, for example, gravure techniques. In this situation, pigment size can be reduced through common milling methods. In the following examples, pigments are milled with chromium stainless steel and/or yttrium stabilized zirconia grinding beads (YTZ®). Reducing particle size improves the packing density of the ink and eliminates print defects in the print method employed. However, it has been found that in certain situations, milling may alter the total reflected IR light of the printed coatings.

Figure 13:
FIG. 13 is a camera image showing a dried coating of the ink of Example 12 and a commercially available tape sample during exposure to IR light (850 nm). Dried coating of Example 12 appears grey; the tape appears black.

The dried near-infrared reflective coatings described herein can be detected by cameras employing, for example, charge coupled device (CCD) or complementary metal oxide semiconductor (CMOS) image sensors. Preferably, the camera is a monochrome CCD or CMOS camera. That is, the coatings can be detected when they are exposed to the near-infrared light emitted by an infrared light source, such as for example a light source emitting at 850 nm, with the light being detected by a CCD or CMOS camera (among other possible digital image sensors). Further with this arrangement, e.g., one using an IR light source and a monochrome CCD or CMOS camera, the dried near-infrared reflective coatings described herein can be differentiated from underlying black materials. FIG. 13 shows the difference between a reflecting black PSA tape (DIC IL-05BMF-S) and coatings prepared from the inks of Example 13 over a black and white drawdown card. The camera image was obtained in a setup including a high intensity LED 850 nm fiber optic light source powered at 350 mA in a diffused beam and a monochrome VGA Mono CCD (CMG03-656×494) sensor with a 780 nm long pass filter. The lens and light source are 21 cm and 18 cm away respectively. The software gain is set at 7 and exposure at 1 ms. The light is incident at ~60°. The measured intensities are 7 and 57. This contrast can be raised using better lighting conditions.

One suitable camera is the Sony Pregius IMX264, which has color and monochrome modes. Detecting in monochrome mode is preferred, as it gives the highest contrast between non-IR and IR-reflective surfaces.

Another suitable camera is the CAM-CIC-5MR/5000R available from Cognex, which includes an Aptina MT9P031CMOS sensor. Filtration of the visible light could be used to amplify the IR signal.

The following examples illustrate specific aspects of the present invention and are not intended to limit the scope thereof in any respect and should not be so construed.

EXAMPLES

Test data described in the present disclosure was obtained in the following ways.

The reported total reflectivity, % R, is measured on a PerkinElmer LAMBDA 900 UV/VIS/NIR Spectrometer equipped with a 150 mm integrating sphere. Measurements are taken over the range of 300-900 nm and values at 850 nm are reported.

Ink viscosity is measured on a Brookfield DV2T viscometer using a SC4-18 spindle in a cup. Inks discussed in this disclosure are all 50 (±20) centipoise (cps) at 20 RPM (26.4/s shear rate).

A Geiger Gravure Printing Press—Proofing and Production unit is used to print inks onto transparent polyethylene terephthalate (PET) films. The 1.5" diameter, 4.5" long cylinder is engraved at 150 lines per inch, LPI, with 135 μm square pyramid shaped 38 μm deep cells aligned at 45°. The print speed is around 90 feet per minute. If not stated otherwise results discussed are passed through the printer twice.

In the examples that follow, the inks are printed onto PET substrate and dried to provide dried coatings.

The CIE color (L*, a*, b*) values are measured using X-Rite SpectroEye spectrophotometer following the measurement standard ISO 5631-3:2008 with CIE standard illuminant D50 and 2° standard observer.

Gloss is measured using a BYK 4563 micro-TRI-Gloss meter at a set angle of 60° following the measurement standard JIS Z 8741. Cross-sectional images of the printed coating on PET were taken on a Topcon scanning electron microscope.

The side without ink coating was laid onto Backstop from Graphic communication Association (GCA) to follow ANSI/ISO standard 5/4-1983, ANSI PH2.17-1985; then X-Rite SpectroEye XRGA Densitometry and Colorimetry (Part No. 36.64.00) is used to measure color density, L, a, and b values by following ISO 5631-3:2008 Paper and board—Determination of color by diffuse reflectance—Part 3: Indoor illumination conditions (D50/2 degrees) [https://www.iso.org/standard/39368.html].

Example 1: Ink Preparation

The inks described herein include a varnish of 25 parts (by weight) of Mowital® B16H, a polyvinyl butyral resin, dissolved 75 parts (by weight) of a 40 wt % ethanol 60 wt % n-propyl acetate solvent system. The varnish is combined with an iron chromium oxide, which is a black inorganic pigment and dispersed using a Cowles blade on a Dispermat mixer at 2000 rpm for 10 minutes. The resulting mixture is referred to as a base. Mowital® B16H is available from Kuraray America, Inc.

For ink samples in which the pigments were not milled, the (40 wt %/60 wt %) solvent system from above would be included into the base. More varnish or solvent (i.e., a deficient) would be added to the coating until the viscosity is 50 cp (±20). While solvent alone can reduce viscosity, and do so faster than varnish, either solvent or varnish could be added as the deficient to obtain both the correct pigment loading and viscosity.

When the inks contain milled pigments, the base was media milled in two stages. The base was first milled with 1.5 mm chromium stainless steel media shaken on a paint shaker. After vacuum straining the base from the media, 30 wt % of the (40 wt %/60 wt %) solvent system was added and the ink was re-milled using 0.8 mm YTZ® media shaken on a paint shaker. The ink was again vacuum strained. Solids percentages were measured by employing common methods to determine the amount of pigment. A deficient comprising the solvent system and/or varnish was added to obtain the intended pigment concentration at a viscosity of 50 cp (±20).

Different pigment grades from multiple vendors were compared for stability along with different dispersants. One preferred inorganic black pigment is BK® 10P950 from Shepherd Color, which provided the best stability without the use of a dispersant. Other pigments and grades could also be used.

Example 2: Coating Color and Reflectance

TABLE 1A

Ink Compositions
All amounts below are in wt %.

| Ink | 2A | 2B | 2C | 2D | 2E | 2F |
|---|---|---|---|---|---|---|
| BK ® 10P950 | 30.0 | 25.0 | 20.0 | 20.0 | 15.0 | 10.0 |
| Mowital ® B 16H | 11.25 | 12.75 | 14.25 | 12.5 | 13.5 | 14.5 |
| Ethanol | 23.5 | 24.9 | 26.3 | 27 | 28.6 | 30.2 |
| N-Propyl Acetate | 35.25 | 24.9 | 26.3 | 27.0 | 28.6 | 30.2 |
| TOTAL | 100 | 100 | 100 | 100 | 100 | 100 |

The influence of the pigment concentration on coating color and reflectance was evaluated. Inks 2A-2C were prepared according to Example 1 with 75 wt % of the formulation comprising the varnish and pigment. Solvent was added at 25 wt % and made up the majority of the 10 wt % deficient. The pigments in Inks 2A-2C were not milled. The inks were gravure printed onto PET substrates with a drying step in between each pass. The 200 LPI cylinder used for printing had a low transfer that required 3 passes to obtain a suitable coating thickness.

Inks 2D-2F were milled prior to printing. Inks 2D-2F were made from the base, and employed the milling and separation protocols described in Example 1. About 70 wt % of the formulation comprises varnish and pigment. The varnish and pigment were milled into a base for 2 hours using 1.5 mm chromium stainless steel media. Following the 25 wt % solvent addition, the ink was milled for another two hours using 0.8 mm YTZ® media. Following a viscosity check, the majority of the 5 wt % deficient added to adjust viscosity was solvent. The finished inks fell within the viscosity range of 50 cp (±20). A different cylinder was used for printing these inks as it achieved a suitable coating thickness in two passes when the pigment loading is 20 wt % or higher.

The data in Table 1B below shows that Inks 2A-2C give different responses for the CIELAB color values and the total percent of light reflected at 850 nm (reflectivity (%)). Lower L* values indicate darker, less reflected visible light, and high values indicate a brighter color. Lowering the pigment level in the formulation reduces L* value and increases reflectivity (%). As the amount of pigment in the formulation falls below 20 wt %, more print passes were required to obtain a suitable coating thickness under these printing conditions.

As both the print cylinder and media milling can impact the CIELAB values and reflectivity (%), inks 2D-2F are used for comparison to 2A-2C. the plot in FIG. 1 shows is a gap in color values (L*, a*, b*) between the 20 wt % pigment inks, 2C & 2D, due to either the milling or the change in coating thickness from the new cylinder. The reflectivity (%) however, appears continuous in the graph. This indicates that the change in thickness in conjunction with the impact of milling protocol employed results in a net zero change on reflectivity (%).

There is another effect from the coating thickness. A tradeoff in the number of passes versus reflectivity (%) is demonstrated as the number of print passes increases from 3 to 5 in the last 3 rows of Table 1. There is a local maxima in reflectivity (%) at 4 passes indicating an optimal coating thickness that maximizes reflectivity (%). As the ink is printed thicker at 5 passes, the reflectivity (%) at 850 nm begins to decrease even as the L* value continues to fall. (wt % pigment refers to the amount of pigment after adjusting viscosity).

is defined as the arithmetic average value of roughness from deviations about a centerline. The $R_a$ values from the coatings discussed herein are all below 1.0 μm. Values of $R_a$ up to 1.0 μm do not increase the scattering of 850 nm light.

Example 3: Coating Thickness Per Print Pass

The inks of Example 3 contain 25 wt % Shepherd BK® 10P950 pigment, 12.5 wt % Mowital® B 16H resin, 25 wt % ethanol, and 37.5 wt % n-propyl acetate.

In a preferred aspect of the dried coatings described herein, the dry coating thickness is about 0.3 μm to 2 μm. One factor to be accounted for in achieving the thicknesses in this range is pigment particle size. The average inorganic pigment particle size at of about 1 μm may make it difficult to achieving a smooth coating. As the particles sizes approach the coating thickness, erratic stacking prevents the

TABLE 1B

Pigment Amount (wt %) Impacts Reflectivity (%) at 850 nm and CIELAB Color Values

| Ink | wt % Pigment | Print Passes | Cylinder LPI | Milling | reflectivity (%) @ 850 nm | L* | a* | b* | Gloss |
|---|---|---|---|---|---|---|---|---|---|
| 2A | 30 | 3 | 200 | None | 23.8 | 26.4 | 3.0 | 1.4 | 5.0 |
| 2B | 25 | 3 | 200 | None | 26.1 | 23.9 | 3.6 | 1.5 | 8.3 |
| 2C | 20 | 3 | 200 | None | 27.6 | 20.6 | 4.6 | 2.2 | 15.7 |
| 2D | 20 | 3 | 150 | 2 Hr_2 Hr | 27.3 | 17.2 | 7.6 | 5.0 | 68.6 |
| 2E | 15 | 3 | 150 | 2 Hr_2 Hr | 29.1 | 16.3 | 8.4 | 5.7 | 66.0 |
| 2F | 10 | 3 | 150 | 2 Hr_2 Hr | 29.9 | 16.4 | 9.9 | 7.0 | 73.1 |
| 2F | 10 | 4 | 150 | 2 Hr_2 Hr | 30.3 | 15.8 | 9.6 | 7.0 | 63.4 |
| 2F | 10 | 5 | 150 | 2 Hr_2 Hr | 29.3 | 15.5 | 9.3 | 6.9 | 65.3 |
| ABS1 | 25 | 2 | 150 | 10 min | 10.5 | 12.3 | −0.8 | −3.8 | 96 |
| ABS2 | 25 | 2 | 175 | | 4.2 | 22.5 | 0 | −1 | 2.1 |

The IR absorbing ink ABS1 (provided as a comparative example) includes a carbon black pigment. While the reflectivity (%) is lower much than those measured on the IR reflective coatings, it is not close to zero total reflectance. The non-zero total reflectance is primarily due to the change in refractive index at the air-to-coating interface. A second carbon black ink coating was over-printed with a clear coat containing a matting agent and is labeled ABS2 (provided as a comparative example).

Figure 2:
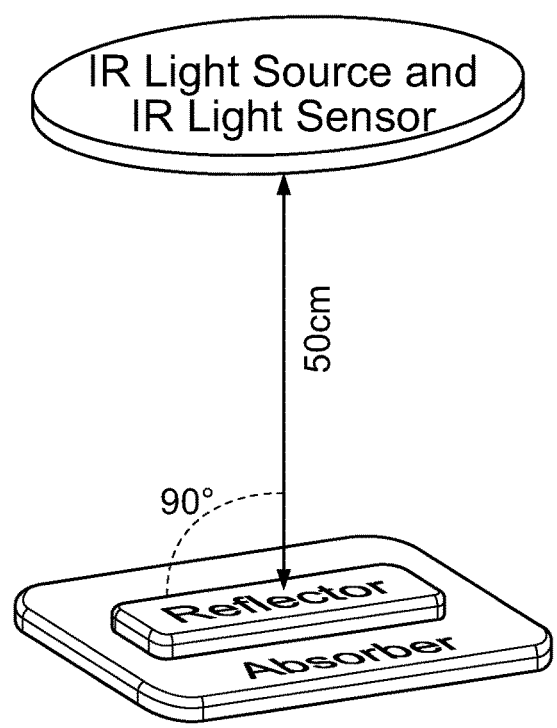
FIG. 2 is a perspective view of an optical configuration that is effective in differentiating between a surface exhibiting near-infrared reflective properties and a surface that does not exhibit near-infrared reflective properties, such as differentiating between a black near-infrared reflective coating and a black non-near-infrared reflective coating.

An IR light source and IR camera can be used to estimate how much of a difference in reflectivity (%) is needed to achieve edge differentiation. The setup should account for the power of the IR light source (in watts), the sensor sensitivity (such as camera's sensor), and the angle and the distance between the light source and the reflective substrate. For a commercially available light source and camera from Cognex, the reflective coating's total reflectance, as measured by the hemispherical reflectance system, is preferably ≥15%, or preferably ≥20%, which is more reflective than the absorber's total reflectance under the following conditions. The light source and camera are in the same plane and both are at a near normal incidence to the substrate at a distance of 50 cm from the substrate. FIG. 2 depicts one suitable optical configuration for evaluating that the difference in reflectance (ΔR %) is large enough for edge differentiation. The arrangement in FIG. 2 is merely exemplary of a suitable configuration.

That ΔR %≥15% is a non-exhaustive guideline that is qualitatively determined by correlating total reflectance measurements with differentiation of the substrates using the optical configuration described. The surface roughness, $R_a$ should not be structured to enhance light capture. Where $R_a$ formation of a smooth coating with a surface roughness ($R_a$) that approaches 1 μm. With pigments that are not milled, dry coating thickness may be over 2 μm and up to 5 μm at a suitable color coverage.

Using common milling methods, a series of inks were prepared according to Example 1. These inks have a 25 wt % pigment loading and 12.5 wt % resin loading Milled inks show much more uniform laydown. SEM scans were used to measure the coating thickness of milled inks that were printed with a 150 LPI cylinder with pyramid shape, 38 μm deep cells, a 45° cell offset, with cell height and width at 135 μm and wall thickness of 10 μm.

The SEM data reported in the table below compares coating thickness of inks that are printed from one to four passes on a Geiger proofer press, with a drying stage in between each print pass.

| Ink | Mill Hours | Passes | Avg Thickness (μm) | Reflectivity @850 nm | D | L* | a | b |
|---|---|---|---|---|---|---|---|---|
| 3A-1 | 6 | 1 | 1.2 | 19.0 | 1.4 | 22.0 | 6.9 | 3.9 |
| 3A-2 | 6 | 2 | 1.9 | 17.5 | 1.6 | 18.3 | 6.1 | 3.7 |
| 3A-3 | 6 | 3 | 2.6 | 16.0 | 1.6 | 18.0 | 6.1 | 3.7 |
| 3A-4 | 6 | 4 | 3.5 | 15.7 | 1.6 | 17.7 | 6.0 | 3.9 |
| 3B-1 | 1 | 1 | 1.1 | 27.4 | 1.4 | 24.4 | 4.9 | 1.9 |
| 3B-2 | 1 | 2 | 2.1 | 25.6 | 1.5 | 19.6 | 5.3 | 2.7 |
| 3B-3 | 1 | 3 | 2.6 | 23.8 | 1.6 | 18.3 | 5.8 | 3.4 |
| 3B-4 | 1 | 4 | 3.7 | 22.6 | 1.6 | 17.7 | 6.1 | 3.8 |
| 3C-1 | 4 | 2 | 1.8 | 27.9 | 1.6 | 18.5 | 6.6 | 3.6 |
| 3C-2 | 4 | 4 | 3.3 | 25.3 | 1.6 | 17.8 | 6.8 | 4.0 |

Figure 3:
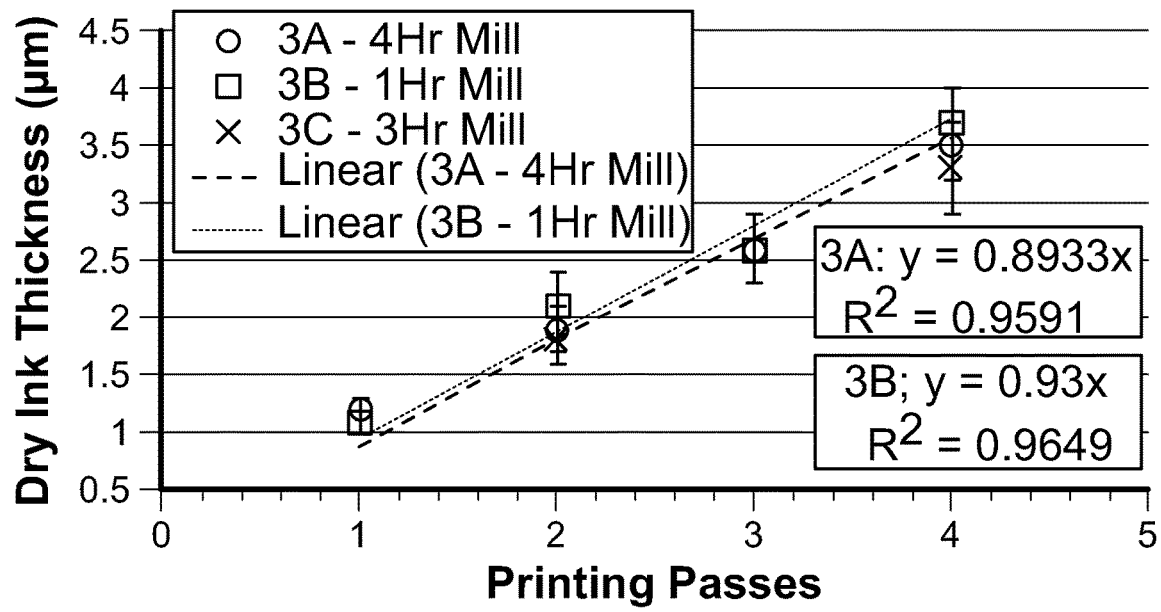
FIG. 3 is a plot of dried coating thickness as determined by SEM measurements vs. the number of printing passes for dried coatings of ink samples formulated from pigments milled 1, 3, and 4 hours.

FIG. 3 is a plot of dry ink thickness as determined by SEM measurement vs. number of printing passes for dried coatings of ink samples formulated from pigments milled 1, 3, and 4 hours. The inks were milled using both 1.5 mm chromium stainless steel followed by 0.8 mm YTZ® ceramic media. Independent of the amount of milling that exceeded one 1 hour, the ink laydown per print pass, when dried, was found to be 1.2 µm or less.

Example 4: Effect of Milling on Total Reflectance and Color

The IR reflectance and CIELAB color values of the Example 3 inks are compared with milling protocols and multiple print passes to increase dry ink/coating thickness. Milling was conducted at 0, 1, 2, 4, and 6 hours using 1.5 mm chromium stainless steel followed by 6 hours in the 0.8 mm YTZ® ceramic media. The stated milling times refer to the hours milled with each media, so the total milling times sum to 0, 2, 4, 8 and 12 hours. The same cylinder from Example 3 is used to print all inks with measurements taken on substrates that have been printed from one to four passes with a drying step in between each pass. The black inks were printed over white paper, such that when the ink is too thin and is not fully opaque, the underlying white color raises the $L^*$ value.

Figure 4:
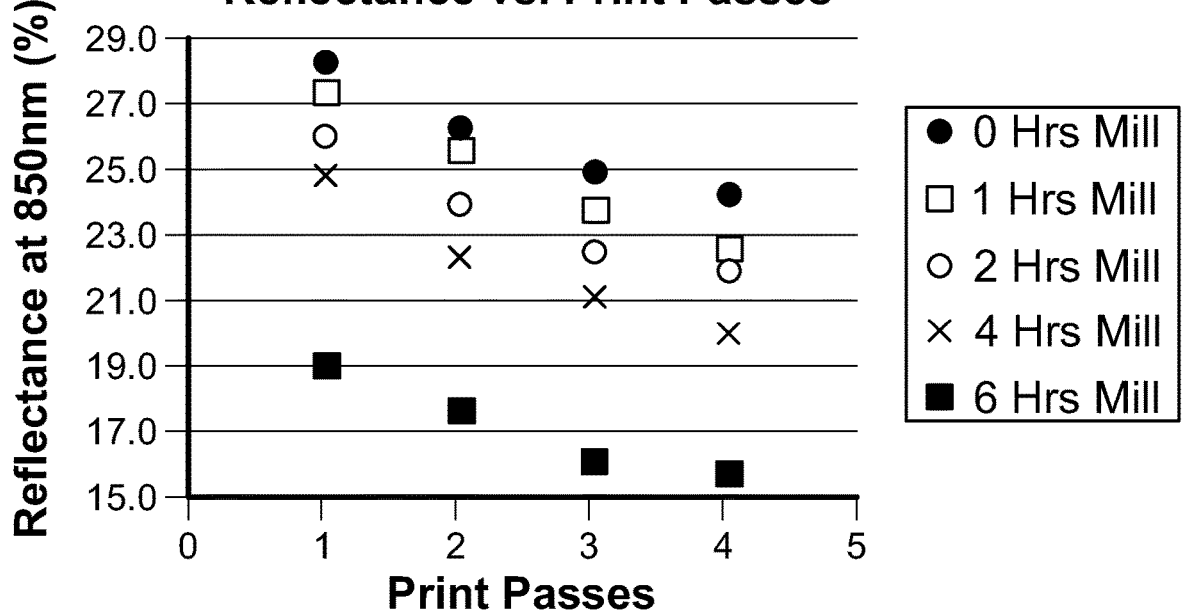
FIG. 4 is a plot of reflectance (%) at 850 nm vs. the number of print passes for dried coatings of ink samples milled 0, 1, 2, 4 and 6 hours, using a tungsten-halogen and deuterium light source filtered through a monochromator.

Table 2 includes the reflectivity (%) and CIELAB values for the tested inks. FIG. 4 shows that milling of the inks lowers the IR reflectivity of the coatings. It also shows that thicker coatings lower the IR reflectivity. From the results reported in FIG. 3, each print pass lays down about 1 µm of ink on average, when dried, using the 150 LPI cylinder.

Figure 5:
FIG. 5 is a plot of L value vs. pigment hours milled for dried coatings of ink samples applied in 1, 2, 3, and 4 printing passes.
Figure 6:
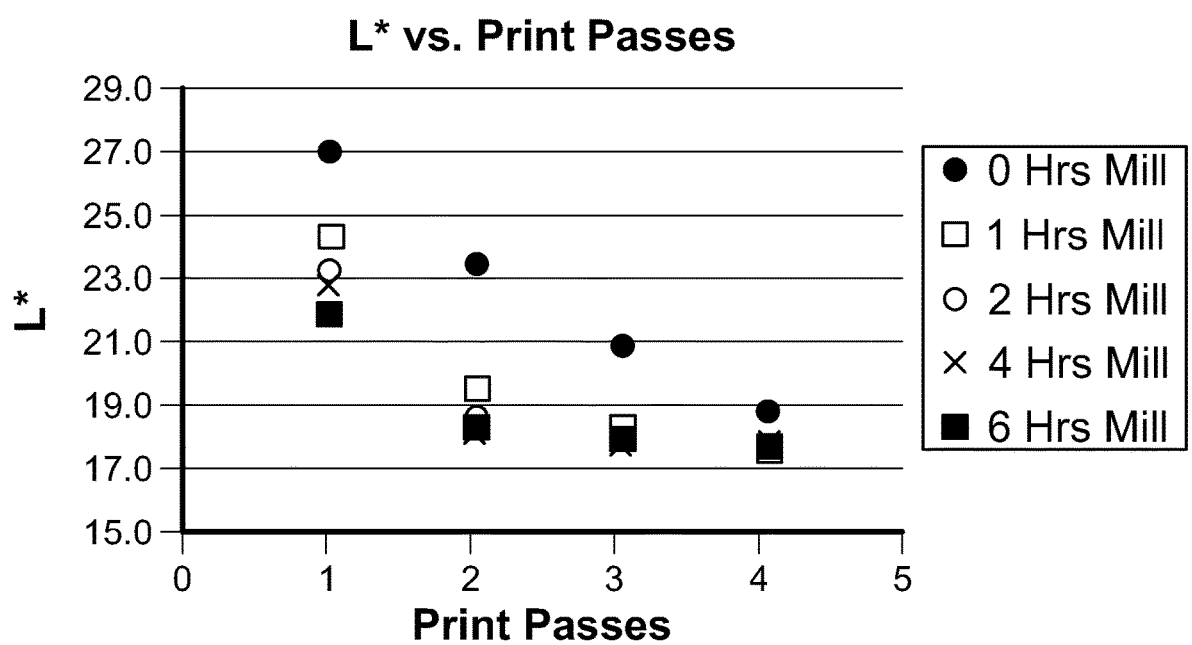
FIG. 6 is a plot of L value vs. printing passes for dried coatings of ink samples including pigments milled for 0, 1, 2, 4, and 6 hours.

FIG. 5 demonstrates that when the ink is not milled, the $L^*$ value is highly divergent at different dried coating thicknesses. The $L^*$ value then converges substantially after just the one hour of milling on inks of 2 µm (2 passes) or greater. Similarly, the same divergence and convergence trends are observable for the $a^*$ and $b^*$ values provided in Table 2. FIG. 6 directed to the inks samples of Table 2, further demonstrates how a 2 µm (2 passes) coating is preferred to enable better control over CIELAB color. For the 1 µm (1 pass) coatings in FIG. 5 the difference in $L^*$ ($L^*_{MAX}-L^*_{MIN}$) for different milling protocols is 4.7, but this difference drops by 60% for the 2 µm (2 passes) coatings.

As shown, ink processing and thickness can impact coating reflectivity (%). With no milling, reflectivity (%) is higher than for milled inks, but print quality is not good enough for thin gravure or similar printed coatings. Good color coverage can be attained with dried coatings that are 1 µm thick or greater. This can be attained with 2 or more printing passes. To reach the Δreflectivity (%) of 15% that is preferred for edge differentiation from a non-reflective IR black coating with reflectivity (%)=10%, a reflectivity (%)=25% coating is needed. This is attained with the Example 4 ink having a 25% pigment loading that has been milled for 1 hour and layed down in 2 printing passes.

TABLE 2

Reflectivity (%) at 850 nm and L*, a*, b* Values for Dried Coatings Prepared from Inks Milled 0, 1, 2, 4, and 6 hours. The inks have been Printed From 1 To 4 Passes Using a Gravure Proofer Press.

| | Mill (Hr) | | | |
|---|---|---|---|---|
| | 0 | 0 | 0 | 0 |
| Passes | 1 | 2 | 3 | 4 |
| reflectivity (%) @ 850 nm | 28.3 | 26.4 | 25.0 | 24.2 |
| L* | 27.1 | 23.6 | 20.9 | 18.8 |
| a* | 4.2 | 3.3 | 3.8 | 4.4 |
| b* | 2.2 | 1.1 | 1.4 | 1.8 |

| | Mill (Hr) | | | |
|---|---|---|---|---|
| | 1 | 1 | 1 | 1 |
| Passes | 1 | 2 | 3 | 4 |
| reflectivity (%) @ 850 nm | 27.4 | 25.6 | 23.8 | 22.6 |
| L* | 24.4 | 19.6 | 18.3 | 17.7 |
| a* | 4.9 | 5.3 | 5.8 | 6.1 |
| b* | 1.9 | 2.7 | 3.4 | 3.8 |

| | Mill (Hr) | | | |
|---|---|---|---|---|
| | 2 | 2 | 2 | 2 |
| Passes | 1 | 2 | 3 | 4 |
| reflectivity (%) @ 850 nm | 26.0 | 24.0 | 22.5 | 21.9 |
| L* | 23.3 | 18.7 | 17.9 | 17.7 |
| a* | 6.2 | 6.3 | 6.5 | 6.5 |
| b* | 2.8 | 3.7 | 4.0 | 4.2 |

| | Mill (Hr) | | | |
|---|---|---|---|---|
| | 4 | 4 | 4 | 4 |
| Passes | 1 | 2 | 3 | 4 |
| reflectivity (%) @ 850 nm | 24.8 | 22.3 | 21.1 | 20.0 |
| L* | 22.9 | 18.2 | 17.8 | 17.8 |
| a* | 6.6 | 6.5 | 6.7 | 6.6 |
| b* | 3.2 | 3.8 | 4.3 | 4.3 |

| | Mill (Hr) | | | |
|---|---|---|---|---|
| | 6 | 6 | 6 | 6 |
| Passes | 1 | 2 | 3 | 4 |
| reflectivity (%) @ 850 nm | 19.0 | 17.5 | 16.0 | 15.7 |
| L* | 22.0 | 18.3 | 18.0 | 17.7 |
| a* | 6.9 | 6.1 | 6.1 | 6.0 |
| b* | 3.9 | 3.7 | 3.7 | 3.9 |

Example 5: Adjustments for Color Specifications

The non-reflective ink, ABS2, from Example 2, was used for comparison. Reflective inks were made with additional pigments to reach the color values of ABS2 with the following values: L=22.5 (±5, more preferably ±2.5); a=0 (±2, more preferably ±1); b=−1 (±2, more preferably ±1).

The baseline formulation and processing of ink 2D from Example 2 was used due to its total reflectance value. Ink 2D is repeated as ink 5A and all Example 5 inks are processed in the same manner as the Example 2 inks.

IR reflective pigments from Shepherd Color were selected based on the color values of ink 2D in which L* was lower than the target, while a* and b* were higher. An attempt was made to increase the L* value by replacing a portion of black pigment with green and blue pigments. Similarly the a* and b* values could be reduced by replacing a portion of black pigment with green and blue pigments. IR reflective inorganic green and blue pigments, GR30C654 and BL211 respectively, were used. Table 3 shows the pigment percentage of each ink, and the resulting CIELAB values and reflectivity (%) of 2-pass prints made by gravure printing on PET.

TABLE 3

| Ink | 5A | 5B | 5C | 5D | 5E | 5F | 5G | 5H |
|---|---|---|---|---|---|---|---|---|
| Components (wt %) | | | | | | | | |
| BK ® 10P950 | 20.00 | 11.20 | 5.60 | 7.53 | 10.10 | 12.15 | 11.20 | 10.20 |
| GR30C654 | | 4.00 | 6.50 | 4.57 | 2.00 | 2.00 | 2.40 | 3.40 |
| BL211 | | 4.80 | 7.90 | 7.90 | 7.90 | 5.85 | 6.40 | 6.40 |
| Mowital ® B 16H | 12.5 | 12.0 | 12.0 | 12.0 | 12.0 | 12.0 | 12.0 | 12.0 |
| Ethanol | 27.0 | 27.2 | 27.2 | 27.2 | 27.2 | 27.2 | 27.2 | 27.2 |
| N-Propyl Acetate | 40.5 | 40.8 | 40.8 | 40.8 | 40.8 | 40.8 | 40.8 | 40.8 |
| Color values and reflectivity (%) @850 nm | | | | | | | | |
| L* | 17.7 | 21.5 | 25.3 | 24.0 | 22.0 | 21.2 | 21.5 | 23.0 |
| a* | 7.4 | 1.8 | −6.1 | −3.1 | 0.0 | 0.9 | 0.8 | 0.1 |
| b* | 4.6 | 1.2 | −0.7 | −1.1 | −2.3 | −1.4 | −1.0 | −0.6 |
| reflectivity (%) @850 nm | 28.3% | 28.2% | 26.7% | 26.7% | 26.3% | 27.1% | 27.2% | 27.2% |

Figure 7:
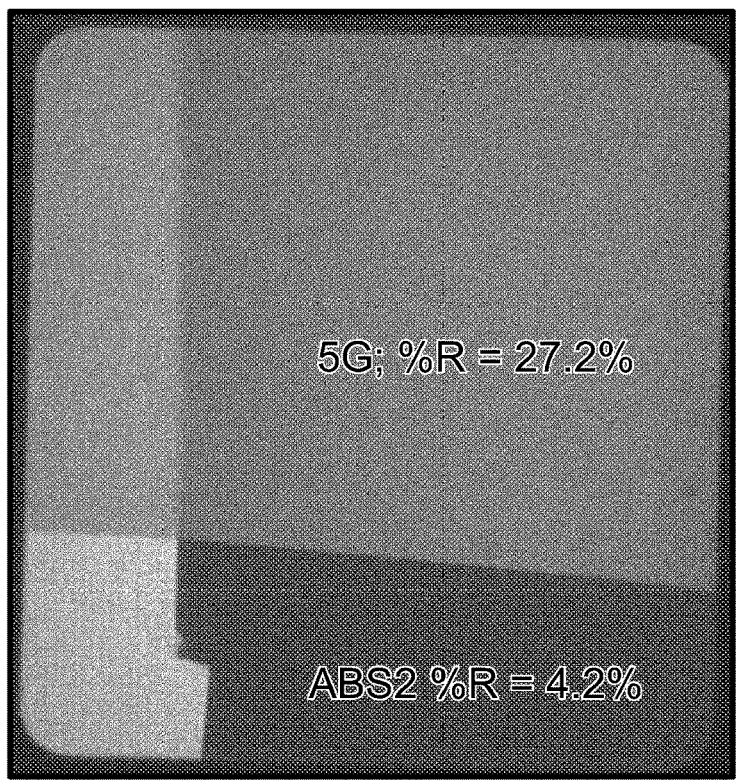
FIG. 7 is a camera image showing a dried coating of the ink of example 5G and a comparative dried coating of ink sample ABS2 on a white table top during exposure to IR light, with the camera being 50 cm away from the surface according to the arrangement shown in FIG. 2. Ink 5G appears grey; ABS2 Ink appears black.

FIG. 7 is an optical image showing that the IR coating effectively provides edge definition against a substrate with nearly identical CIELAB values. FIG. 7 shows a dried coating prepared from the ink of example 5G (L*=21.5, a*=0.8, b*=−1.0) imaged over the ABS2 coating (L*=22.5, a*=0.0, b*=−1.0). The optical image in FIG. 7 was taken using the optical setup of Example 2 (50 cm separation distance, light at normal incidence) to display the contrast between the ABS2 and 5G coatings under IR light. FIG. 7 shows that ΔR % is 23.0, providing clear edge definition between the materials.

Figure 8:
FIG. 8 is a SEM image of a dried coating of the ink of example 5G applied to a PET substrate. The 5G dried coating has a thickness of 2 μm±0.2 μm and reflectivity @ 850 nm of 27.2%.

FIG. 8 shows a SEM cross-section of the 2 μm thick 5G dried ink coating with 27.2% reflectance at 850 nm on a PET substrate.

Example 6: Functionalized Coating Additives

Additives may be included in the inks to impart desired properties to the inks and coatings such as low gloss, abrasion resistance, high adhesion, low coefficient of friction and other performance requirements for a given application. These properties can be attained by adding a suitable property imparting agent to the ink formulation or by incorporating the additional functional materials in a clear top-coat over the IR reflective coating.

As an example of adding a suitable property imparting agent to the ink formulation, a silica-based matting agent is mixed into an ink at 0 wt %, 1 wt %, 2 wt % and 4 wt % of the formulation. Prior to adding the matting agents, the inks are prepared as presented in Example 1. The inks are milled with both media types for 2 hours each. A matting agent is then added to the ink and mixed on a Dispermat mixer using a Cowles blade for 10 minutes at 2000 rpm. The silica matting agent is a commercial product available as ACEMATT® OK 412 available from Evonik. Ink compositions are set forth in Table 4A.

Table 4B reports the resulting values for gloss, surface roughness ($R_a$), and reflectivity (%). Increasing levels of a matting agent lower the gloss by increasing $R_a$. The surface roughness causes light reflection to be more diffuse. The reflectivity (%) remains relatively unchanged by the presence of the matting agent. While the direct reflectance in the visible spectrum is reduced, qualitative tests using an IR camera do not show substantial reductions in the reflectivity at 850 nm as was mentioned in Example 2.

TABLE 4A

Ink Compositions
All amounts below are in wt %.

| Ink | 4A | 4B | 4C | 4D |
|---|---|---|---|---|
| BK ® 10P950 | 20.0 | 19.8 | 19.6 | 20.0 |
| Mowital ® B 16H | 12.0 | 11.88 | 11.75 | 8.9 |
| Ethanol | 27.2 | 26.93 | 26.66 | 26.84 |
| N-Propyl Acetate | 40.8 | 40.4 | 26.66 | 26.84 |
| Silica Matting Agent | 0 | 1.0 | 2.0 | 4.0 |

TABLE 4B

Incorporation of Gloss Reducing Matting Agent

| wt % Matting Agent | 0 | 1 | 2 | 4 |
|---|---|---|---|---|
| Gloss | 28 | 14.8 | 8.5 | 1.6 |
| reflectivity (%) at 850 nm | 26.5 | 26.2 | 25.6 | 27.2 |

Example 7: Effect of Media Size on Total Reflectance and Color

MiniMotor Mill 250, Eiger Machinery Inc, Chicago, Ill., with 80% volume filled with 0.5 mm, 0.8 mm, 1.0 mm, 1.25 mm, 1.5 mm of yttria stabilized zirconia (YTZ®) media respectively for each milling run was used for milling 750 grams of ink base, the formula of which is listed in Table 5. Samples of Example 7A milled bases were taken periodically and formulated into inks according to Example 7B in Table 5.

TABLE 5

Base Formula and Ink Formula

| | Ex. 7A Ink Base wt % | Ex. 7B Ink wt % |
|---|---|---|
| Varnish: 25 wt % Mowital ® B16H/75 wt % 60/40 ethanol/N-propyl acetate blend | 64 | 45 |
| BK ® 10P950 (Shepherd Color Co.) | 18 | 10 |
| BL 211 (Shepherd Color Co.) | 12.24 | 6.8 |
| GR 30C654 (Shepherd Color Co.) | 5.76 | 3.2 |

TABLE 5-continued

| Base Formula and Ink Formula | | |
|---|---|---|
| | Ex. 7A Ink Base wt % | Ex. 7B Ink wt % |
| 60/40 ethanol/N-propyl acetate blend | | 34.5 |
| Z-6020 silane (Dow) | | 0.5 |
| Total | 100.00 | 100.00 |

The inks were coated onto 125 μm Tekra Melinex 454 PET substrates using Geiger Gravure Printing Press with a 150 LPI pyramid gravure cylinder for 2 and 3 passes. For each series of results relating to each size of YTZ® media, reflectivity increases with each pass and decreases with milling time; gloss value increases with milling time with each pass; L value decreases with milling time and with each pass; color a and b values increase with milling time.

Reflectivity (%) @850 nm, Gloss, and the L, a*, and b* color values for 2-pass coatings with pigment time are shown in FIGS. 10A, 10B, 10C, 10D and 10E. Generally in comparison, reflectivity drops from 0.5 mm>0.8 mm>(1.25 mm≈1.0 mm≈1.5 mm); Gloss increases from 0.5 mm>0.8 mm>1.0 mm>1.25 mm>1.5 mm; L drops from 0.5 mm>0.8 mm>1.0 mm>1.25 mm>1.5 mm; a and b increase from 0.5 mm>0.8 mm>1.0 mm>1.25 mm>1.5 mm.

Example 8: Effect of Eiger Mill on Total Reflectance and Color

MiniMotor Mill 250, Eiger Machinery Inc, Chicago, Ill., with 80% volume filled with 0.8 mm YTZ® media was used for milling 750 grams of ink base (Example 8A). Samples of milled bases were taken periodically and formulated into Example 8B ink. See Table 6 below.

TABLE 6

| Ink Base Formula and Ink Formula | | |
|---|---|---|
| | Ex. 8A Ink Base wt % | Ex. 8B Ink wt % |
| Varnish: 25 wt % Mowital ® B16H/75 wt % 60/40 ethanol/N-propyl acetate blend | 54.471 | 39.368 |
| BK ® 10P950 | 30.09 | 13.125 |
| BL 211 | 9.428 | 4.113 |
| GR 30C654 | 0.602 | 0.263 |
| Keyfast Blue 6G-SS (Keyfast Aniline Corp) | 2.658 | 1.159 |
| 60/40 ethanol/N-propyl acetate blend | | 39.774 |
| Z-6020 silane | | 1 |
| BYK 410 | 0.459 | 0.2 |
| DisperBYK 2117 (BYK) | 2.293 | 1 |
| Total | 100 | 100 |

The inks were coated onto 125 μm transparent PET substrates using Geiger Gravure Printing Press with 150 LPI pyramid gravure cylinder for 2, 3 and 4 passes. The variations of reflectivity @850 nm, Gloss, L, a, and b color values with time are shown in FIGS. 11A, 11B, 11C, 11D and 11E, respectively. Reflectivity increases with each pass and decreases with milling time; Gloss value increases with milling time and with each pass; Color L value decreases with milling time and with each pass; Color a* and b* values increase with milling time; and color b value stays above 0 after ~40 minutes.

Example 9: Effect of Basket Mill on Total Reflectance and Color

HockMeyer HCPS-1/4 Immersion Mill with 0.5 mm YTZ® media was used for milling 12 kg of Example 9A ink base listed in Table 7. Samples of milled ink bases were taken periodically and formulated into Example 9B ink.

TABLE 7

| Base Formula and Ink Formula | | |
|---|---|---|
| | Ex. 9A Ink Base wt % | Ex. 9B Ink wt % |
| Varnish: 25 wt % Mowital ® B16H/75% 60/40 ethanol/N-propyl acetate blend | 61.115 | 43.4 |
| BK ® 10P950 | 27.54 | 15.3 |
| BL 211 | 8.46 | 4.7 |
| Keyfast Blue 6G-SS | 2.385 | 1.325 |
| 60/40 ethanol/N-propyl acetate blend | | 33.997 |
| Z-6020 silane | | 1 |
| BYK D 410 (BYK) | 0.5 | 0.278 |
| Total | 100.000 | 100.000 |

Figure 12:
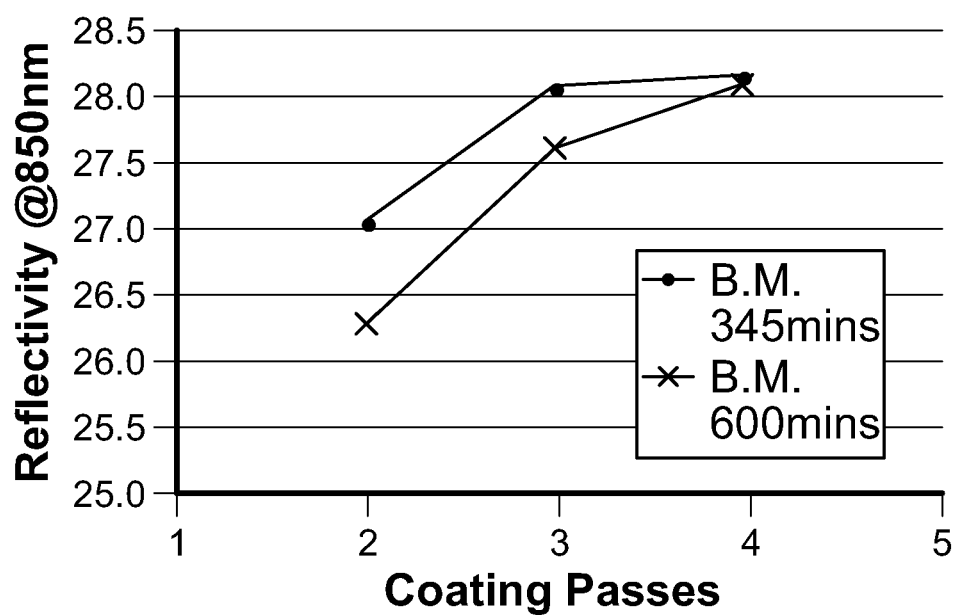
FIG. 12 is a plot of reflectivity (%) at 850 nm vs. coating passes at different basket-milling times for dried coatings prepared from ink samples.

The inks were coated onto 125 μm PET using Geiger Gravure Printing Press with 2, 3 and 4 passes. The reflectivity @850 nm, Gloss, L, a, and b color values are shown in the following figures. Reflectivity increases with each pass and decreases with milling time. The results are shown in FIG. 12.

Example 10: Effect of Pigment Wt % on Total Reflectance, Gloss and Color 12 kg of Example 10 ink base Table 8 was milled on a HockMeyer HCPS-1/4 Immersion Mill with 0.5 mm YTZ® media for 10 hours. Portions of the ink base was formulated into Examples 10A, 10B, 10C, 10D, 10E, each containing 15, 17.5, 20, 21, and 22 wt % inorganic pigments, respectively.

TABLE 8

| | Ink Base Formula and Ink Formulas | | | | | |
|---|---|---|---|---|---|---|
| | Base Formula | Ink Formula | | | | |
| Ink/Base ID | Ex 10 wt % | Ex. 10A wt % | Ex. 10B wt % | Ex. 10C wt % | Ex. 10D wt % | Ex. 10E wt % |
| Varnish: 25 wt % Mowital ® B16H/ 75 wt % 60/40 ethanol/N-propyl acetate blend | 61.115 | 49.400 | 46.100 | 43.400 | 43.400 | 43.400 |

TABLE 8-continued

Ink Base Formula and Ink Formulas

| | Base Formula | Ink Formula | | | | |
|---|---|---|---|---|---|---|
| Ink/Base ID | Ex 10 wt % | Ex. 10A wt % | Ex. 10B wt % | Ex. 10C wt % | Ex. 10D wt % | Ex. 10E wt % |
| BK ® 10P950 | 27 | 11.250 | 13.125 | 15.000 | 15.750 | 16.500 |
| BL 211 | 8.46 | 3.525 | 4.113 | 4.700 | 4.935 | 5.170 |
| GR 30C654 | 0.54 | 0.225 | 0.263 | 0.300 | 0.315 | 0.330 |
| Keyfast Blue 6G-SS | 2.385 | 0.994 | 1.159 | 1.325 | 1.391 | 1.458 |
| 60/40 ethanol/N-propyl acetate blend | | 33.398 | 33.997 | 33.997 | 32.917 | 31.837 |
| Z-6020 silane | | 1.000 | 1.000 | 1.000 | 1.000 | 1.000 |
| BYK D410 | 0.5 | 0.209 | 0.243 | 0.278 | 0.292 | 0.306 |
| Total | 100 | 100.000 | 100.000 | 100.000 | 100.000 | 100.000 |
| Shepherd inorganic pigment (wt %) in ink | | 15.0% | 17.5% | 20% | 21% | 22% |

BYK D410 is a liquid rheology additive available from Byk Chemie GmbH. Z-6020 silane has the chemical formula N-(β-aminoethyl)-γ-aminopropyl-thrimethoxysilane, available from Dow Corning®.

The inks of Examples 10A-10E were coated onto 125 μm PET using Geiger Gravure Printing Press with 3 passes. The reflectivity @850 nm, Gloss, L, a, and b color values are shown in Table 9. it appears that the color L value increase 0.5 per percentage increase of pigments in the total Shepherd inorganic pigments range of 15 to 20 wt % then level off in the pigment range of 20 to 22 wt %; color a value increases ~0.1 per percentage increase of pigments in the pigments range of 15 to 20 wt % then levels off; color b value decreases ~0.1 per percentage increase of pigments in the pigments range of 15 to 20 wt % then levels off; gloss value decreases ~3.5 per percentage increase of pigments in the pigments range of 15 to 20 wt % then levels off; Reflectivity@850 nm value varies less than 1% in the total inorganic pigments range of 15 to 22 wt %.

TABLE 9

Performance of Inks in Table 8

| Ink ID | Ex. 10A | Ex. 10B | Ex. 10C | Ex. 10D | Ex. 10E |
|---|---|---|---|---|---|
| Shepherd inorganic pigment % in ink | 15 | 17.5 | 20 | 21 | 22 |
| Viscosity @ 26.4/s | 52.5 cP | 44.1 cP | 49.5 cP | 47.7 cP | 53.4 cP |
| Reflectivity @ 850 nm | 27.6% | 28.1% | 28.1% | 28.5% | 27.8% |
| Gloss | 45.2 | 36.1 | 27 | 26.7 | 24.4 |
| L | 19.1 | 20.1 | 21.6 | 21.8 | 21.8 |
| a | −0.9 | −0.6 | −0.5 | −0.5 | −0.5 |
| b | −0.6 | −0.8 | −1.1 | −1.1 | −1.2 |

It appears that the L values increase 0.5 per wt % increase of pigments in the total inorganic pigments range of 15 to 20 wt %, then level off in the pigment range of 20 to 22 wt %; color a* value increases ~0.1 per wt % pigments in the pigments range of 15 to 20 wt % then levels off; b*value decreases ~0.1 per wt % increase of pigments in the pigments range of 15 to 20 wt % then levels off; gloss value decreases ~3.5 per wt % increase of pigments in the pigments range of 15 to 20 wt % then levels off; and Reflectivity@850 nm value varies less than 1% in the total inorganic pigments range of 15 to 22 wt %.

Example 11: Effect of Different Pigments on Total Reflectance, Gloss and Color 135 g of inks in Table 10 were milled at 5000 RPM for 1 hour on Model-L2AIR Rotor Stator mixer, Silverson Machines Ltd, Waterside, Chesham, Bucks UK.

TABLE 10

Ink Base Formula and Ink Formulas

| Ink ID | Ex. 11A wt % | Ex. 11B wt % |
|---|---|---|
| Varnish: 25 wt % Mowital ® B16H/ 75 wt % 60/40 ethanol/N-propyl acetate blend | 51 | 50 |
| Sicopal ® Black L 0095 | | 25 |
| BK ® 10P950 | 25 | |
| 60/40 ethanol/N-propyl acetate blend | 24 | 25 |
| Total | 100 | 100 |

The inks were coated onto 125 μm PET using Geiger Gravure Printing Press with a 200 LPI gravure cylinder for 3 passes. Their color properties are listed in Table 11.

TABLE 11

Performances of Inks in Table 10

| Ink ID | Ex. 11A | Ex. 11B |
|---|---|---|
| Reflectivity @ 850 nm | 26.1% | 21.0% |
| Color Density | 1.4 | 1.3 |
| L avg | 23.9 | 26.2 |
| a avg | 3.6 | 1.7 |
| b avg | 1.5 | 0.7 |

Two alternative stack structures that also would show the edge differentiation include incorporating the IR reflective inorganic pigments into either the substrate material or secondly into the adhesive layer. See, e.g., FIGS. 9B and 9C, and the descriptions thereof.

Example 12: Near-Infrared Reflective Ink and Dried Coating with Matte Layer

An ink was prepared that had the following composition:

| Example 12 Ink | wt % |
|---|---|
| BK ® 10P950 | 9.9 |
| BL 211 | 6.7 |
| GR 30C654 | 3.2 |
| Mowital ® B16H | 12.3 |
| Ethanol | 26.6 |
| N-propyl acetate | 39.9 |
| Z-6020 silane | 0.50 |
| DisperBYK 2117 | 1.0 |
| Total | 100 |

DisperBYK 2117 is a solvent-free wetting and dispersing additive, available from BYK Chemie GmbH.

FIG. 13 is a camera image that shows the difference as perceived by an optical sensor between black PSA tape (DIC IL-05BMF-S) and a dried coating of the Example 12 ink, which have been applied to a black and white drawdown card. The camera image was obtained in a setup including a high intensity LED 850 nm fiber optic light source powered at 350 mA in a diffused beam and a monochrome VGA Mono CCD (CMG03-656×494) sensor with a 780 nm long pass filter. The lens and light source are 21 cm and 18 cm away respectively. The software gain is set at 7 and exposure at 1 ms. The light is incident at ~60°. The measured intensities are 7 and 57.

Figure 14:
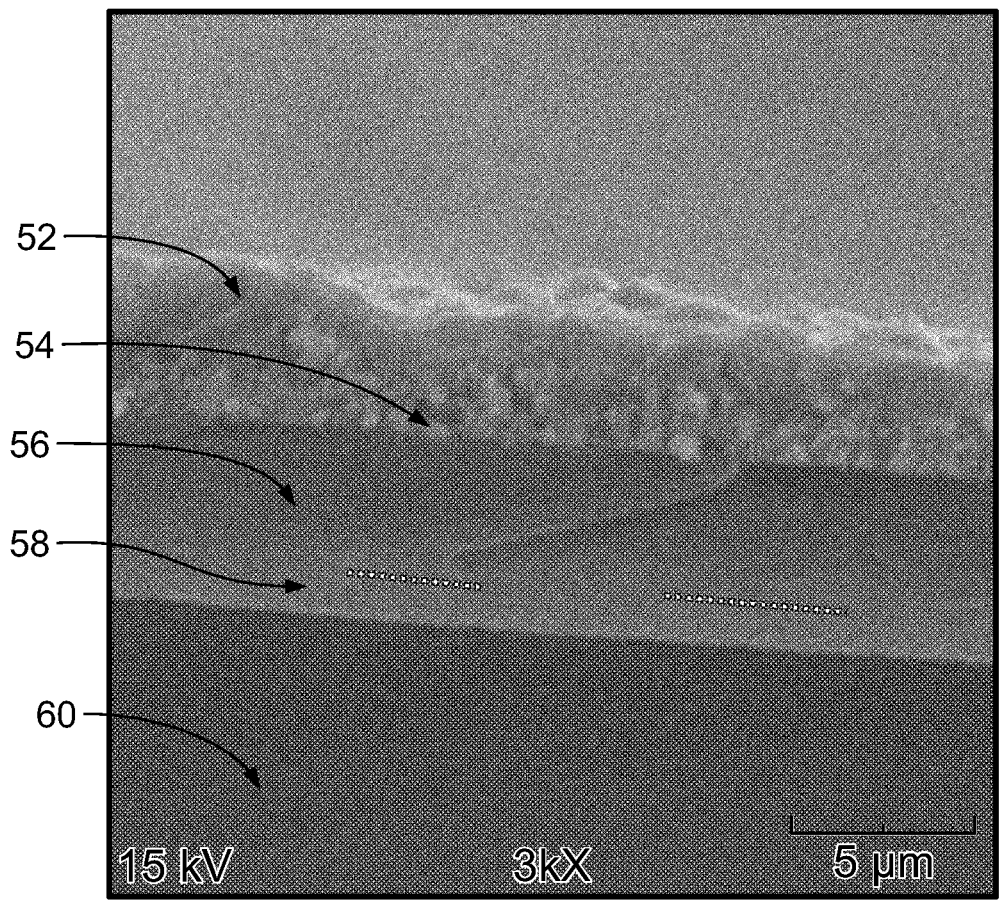
FIG. 14 is SEM image of a structure including a matte layer and a dried coating of the ink of Example 12.

FIG. 14 is a SEM image of a structure comprising a matte layer 52 applied as an overprint varnish, near-infrared reflective coating layer 54, PET substrate 58, adhesive layer 58, and carbon sheet 60. The near-infrared reflective coating layer 54 is 2.3 μm thick. PET layer is 3.5 μm thick. Adhesive layer 58 is 1.5 μm thick. Reflectance % is 30.7 at 850 nm. Gloss is 3.7. CIELAB color space values are L=28.0, a*=0.59, b*=0.13. These values are averages calculated from five (5) measurements on each of three (3) areas.

Example 13: Near-Infrared Reflective Pressure Sensitive Adhesive Tape

A near-infrared reflective ink as described herein was gravure coated on a polyester film (F53 Lumirror #3.5 (thickness: 3.5 μm), available from Toray Industries, Inc). The ink layer was dried. The dry film thickness dried ink coating 1.0 μm. Drying took place at 100° C. for 1 minute. The thickness of the ink coating film portion of the infrared ray reflective layer was measured by cutting the film with a razor and enlarging the cross section by 2500 times with a microscope.

An overprint varnish, OS-M Suedo OP, manufactured by Dainichi Seika Co., Ltd. was applied by gravure coating over the dried coating of near-infrared reflective ink. The matting agent was dried at 100° C. for 1 minute and aged at 40° C. for 2 days to provide a matte layer having a thickness of 1.5 μm.

A pressure sensitive adhesive was gravure coated on a release liner (trade name PET 38×1 K 0, available from Nippa Corporation). The layer of pressure sensitive adhesive had a dry thickness of 2 μm. Drying took place at 100° C. for 1 minute. The adhesive (with release liner) was applied to the side of the polyester film opposite the near-infrared reflecting coating layer. Further ageing occurred at 40° C. for 2 days to obtain a black near-infrared reflecting adhesive tape. The total thickness of the black near-infrared reflecting adhesive tape was 8.0 μm.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A near-infrared light reflective ink comprised of:
    (a) at least one inorganic pigment that reflects near-infrared light;
    (b) a polymeric resin component; and
    (c) a solvent
    wherein, when the near-infrared light reflective ink is applied to a substrate and dried to form a coating with a thickness of 0.1 μm to 50 μm, the coating has a reflectance of ≥11% at a near-infrared light emission of 850 nm.

2. The near-infrared reflective ink of claim 1, wherein the at least one inorganic pigment that reflects near-infrared light is selected from an inorganic black pigment, an inorganic colored pigment having low hue color with L* values below 45, and combinations thereof.

3. The near-infrared reflective ink of claim 2, wherein the amount of inorganic black pigment present in the near-infrared reflective ink is 5 wt % to 50 wt %, based on the total weight of the ink; and/or wherein the amount of inorganic colored pigment present in the ink is 2 wt % to 20 wt % based on the total weight of the ink.

4. A dried coating comprising the near-infrared reflective ink of claim 3, that has been dried, wherein the coating has a thickness of 1.0 μm to 20 μm.

5. The dried coating of claim 4, wherein the coating comprises low hue colors having L* values below 45.

6. The dried coating of claim 4, wherein the coating has CIELAB values of: L=15 to 36, a*=−3.5 to 10, b*=−3.5 to 8.

7. A near infrared reflective article, comprising: the dried coating of claim 4 on a substrate.

8. The near-infrared reflective article of claim 7, wherein the ink has been applied by a method selected from flexography, gravure, lithography, screen, and digital printing.

9. A near-infrared light reflective tape comprising:
    a) the dried coating of claim 4 on a side of a support layer;
    b) an adhesive layer on a side of the support layer;
    wherein the near-infrared-reflective tape has a thickness of 2.0 μm to 200 μm.

10. The near-infrared light reflective tape of claim 9, further comprising a matte layer over the dried coating; and/or further comprising a release liner applied over the adhesive layer.

11. The near-infrared light-reflective tape of claim 9, wherein the adhesive tape is a pressure sensitive adhesive tape.

12. The near-infrared light-reflective tape of claim 9, wherein the ink has been applied by a method selected from flexography, gravure, lithography, screen, and digital printing.

13. A dried coating comprising the near-infrared reflective ink of claim 3, that has been dried, wherein at a coating thickness of 0.1 μm to 5 μm, the coating has a reflectance of ≥11%; at a near-infrared light emission of 850 nm.

14. The near-infrared reflective ink of claim 2, wherein the inorganic black pigment is selected from chromium iron oxide, chromium iron nickel oxide, copper chromite, iron chromite, manganese ferrite, nickel manganese iron oxide, non-IR reflective inorganic black pigments, and combinations thereof; and/or wherein the inorganic colored pigment is selected from bismuth vanadate, chrome antimony titanate, chromium oxide, cobalt aluminate, cobalt chromite, cobalt chromium aluminate, cobalt lithium aluminate, cobalt titanate, iron chromite, iron titanium chromite, lead chromate, manganese antimony titanate, manganese titanate, nickel antimony titanate, nickel titanate, niobium tin pyrochlore, tin zinc, titanium oxide, zinc ferrite, zinc iron chromite, non-IR reflective inorganic colored pigments, and combinations thereof.

15. The near-infrared reflective ink of claim 1, wherein the resin is present in an amount of 1.0 wt % to 35 wt %; and/or wherein the solvent is present in an amount of 5.0 wt % to 80 wt %.

16. The near-infrared reflective ink of claim 1, wherein the ink further comprises additives selected from rheology-modifiers, dispersants, defoaming agents, matting agents, adhesion promoters, waxes, surfactants, and hardening agents.

17. The near-infrared reflective ink of claim 1, wherein the ink is free of azo-based compounds.

18. The near-infrared reflective ink of claim 1, wherein the ink is free of triblock polymers.

19. The near-infrared reflective ink of claim 1, wherein, when dried to form a dried coating with a thickness of 0.1 µm to 50 µm, exhibits
CIELAB values of: L=15 to 36, a*=−3.5 to 10, b*=−3.5 to 8.

20. A near infrared reflective article, comprising: the dried coating of claim 19 on a substrate.

21. A near-infrared light reflective tape comprising:
a) a dried coating prepared from the ink of claim 19 on a side of a support layer;
b) an adhesive layer on a side of the support layer;
wherein the near-infrared-reflective tape has a thickness of 2.0 µm to 200 µm.

22. The near-infrared light reflective tape of claim 21, further comprising a matte layer over the dried coating; and/or further comprising a release liner applied over the adhesive layer.

23. The near-infrared light-reflective tape of claim 21, wherein the adhesive tape is a pressure sensitive adhesive tape.

* * * * *